(12) United States Patent
Takao

(10) Patent No.: US 10,148,863 B2
(45) Date of Patent: Dec. 4, 2018

(54) INFORMATION PROCESSING APPARATUS AND INFORMATION PROCESSING METHOD

(71) Applicant: CANON KABUSHIKI KAISHA, Tokyo (JP)

(72) Inventor: Yumi Takao, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 15/369,099

(22) Filed: Dec. 5, 2016

(65) Prior Publication Data

US 2017/0163875 A1    Jun. 8, 2017

(30) Foreign Application Priority Data

Dec. 8, 2015 (JP) .................................. 2015-239135

(51) Int. Cl.
| | |
|---|---|
| *H04N 7/18* | (2006.01) |
| *H04N 5/232* | (2006.01) |
| *G02B 7/09* | (2006.01) |
| *H04N 13/225* | (2018.01) |
| *H04N 13/271* | (2018.01) |
| *H04N 13/296* | (2018.01) |
| *H04N 5/357* | (2011.01) |
| *H04N 5/369* | (2011.01) |
| *H04N 13/218* | (2018.01) |
| *H04N 13/257* | (2018.01) |

(52) U.S. Cl.
CPC .......... *H04N 5/23212* (2013.01); *G02B 7/09* (2013.01); *H04N 5/3572* (2013.01); *H04N 5/3696* (2013.01); *H04N 13/218* (2018.05); *H04N 13/225* (2018.05); *H04N 13/271* (2018.05); *H04N 13/296* (2018.05); *H04N 13/257* (2018.05)

(58) Field of Classification Search
CPC .......................... H04N 5/3572; H04N 13/218
USPC .......................................................... 348/49
See application file for complete search history.

(56) References Cited

FOREIGN PATENT DOCUMENTS

JP             2014-126858 A         7/2014

*Primary Examiner* — Richard T Torrente
(74) *Attorney, Agent, or Firm* — Cowan, Liebowitz & Latman, P.C.

(57) ABSTRACT

Provided is an information processing apparatus having an aberration information obtaining unit configured to obtain first aberration information of an image capturing optical system associated with the first pupil region and second aberration information of the image capturing optical system associated with the second pupil region; a calculation unit configured to calculate a first defocus information based on at least one of the first image signal and the second image signal; and a correction unit configured to correct the first defocus information based on the first aberration information and the second aberration information to generate a second defocus information.

16 Claims, 16 Drawing Sheets

| 219(1,1) | 219(1,2) | 219(1,3) | 219(1,4) | 219(1,5) |
| --- | --- | --- | --- | --- |
| 219(2,1) | 219(2,2) | 219(2,3) | 219(2,4) | 219(2,5) |
| 219(3,1) | 219(3,2) | 219(3,3) | 219(3,4) | 219(3,5) |
| 219(4,1) | 219(4,2) | 219(4,3) | 219(4,4) | 219(4,5) |
| 219(5,1) | 219(5,2) | 219(5,3) | 219(5,4) | 219(5,5) |

| 0 | 0 | 0 | 0 | 0 |
|---|---|---|---|---|
| 0 | 0 | 0 | +3 | +1 |
| 0 | 0 | 0 | +3 | +3 |
| 0 | +4 | +4 | +4 | +4 |
| +6 | +5 | +5 | +5 | +5 |

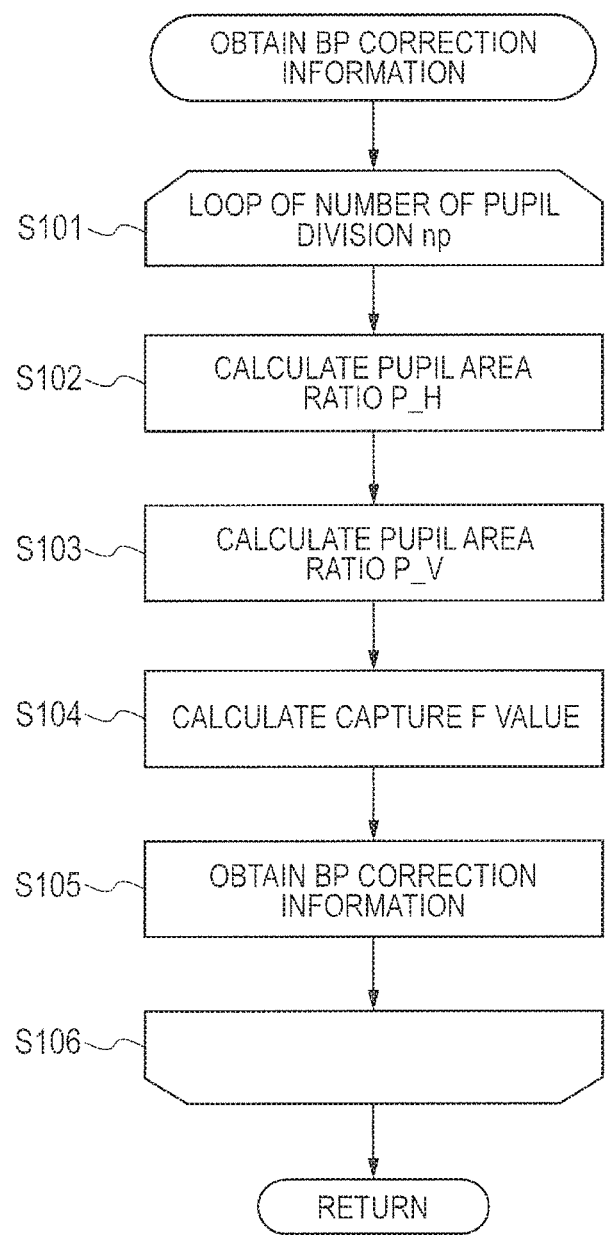

|  | DIRECTION | | COLOR | | |
|---|---|---|---|---|---|
|  | HORIZONTAL | VERTICAL | RED | GREEN | BLUE |
| FOCUS DETECTION | K_AF_H | K_AF_V | K_AF_R | K_AF_G | K_AF_B |
| CAPTURED IMAGE | K_IMG_H | K_IMG_V | K_IMG_R | K_IMG_G | K_IMG_B |

|  | FREQUENCY | | | |
|---|---|---|---|---|
|  | Fq1 | Fq2 | Fq3 | Fq4 |
| FOCUS DETECTION | K_AF_Fq1 | K_AF_Fq2 | K_AF_Fq3 | K_AF_Fq4 |
| CAPTURED IMAGE | K_IMG_Fq1 | K_IMG_Fq2 | K_IMG_Fq3 | K_IMG_Fq4 |

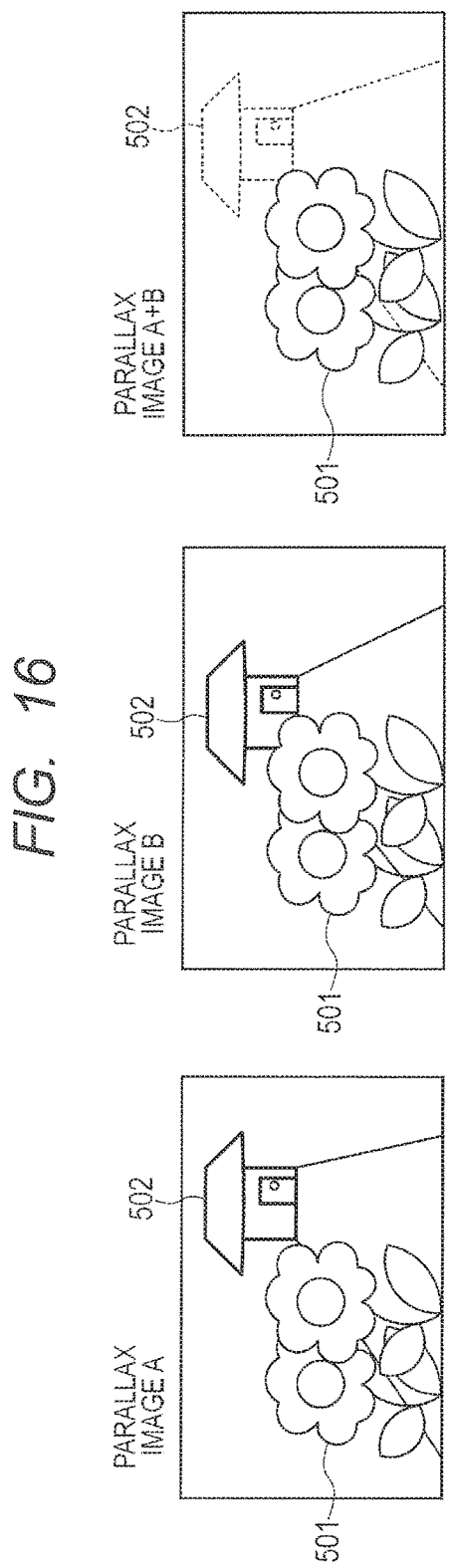

INFORMATION PROCESSING APPARATUS AND INFORMATION PROCESSING METHOD

BACKGROUND OF THE INVENTION

Field of the Invention

The present invention relates to an information processing apparatus and an information processing method and, in particular, relates to a distance map generation technique by using an auto focusing technique.

Description of the Related Art

As a system for auto focusing (hereafter, referred to as "AF") that detects a focus state of an image capturing optical system, there are a contrast AF system and a phase difference AF system. The contrast AF system and the phase difference AF system may be used in an imaging apparatus such as a video camera, a digital still camera, or the like. In some of such imaging apparatus, an imaging device used for capturing may also be used as a focus detection device.

Since an optical image is utilized to perform focus detection in the contrast AF system and the phase difference AF system, an aberration in an optical system that captures an optical image may cause an error in the focus detection result. A method for reducing such an error has been proposed.

Japanese Patent Application Laid-open No. 2014-126858 discloses a technique in which, based on a focus evaluation value obtained by the contrast AF system, a distribution of object distances included in a captured scene is calculated to generate a distance map. In the technique of Japanese Patent Application Laid-open No. 2014-126858, a focus detection error due to a design-based optical aberration and a manufacturing error of the imaging lens is corrected based on coordinates of a focus detection region.

SUMMARY OF THE INVENTION

According to one embodiment of the present invention, provided is an information processing apparatus that includes: an image signal obtaining unit configured to obtain a first image signal based on a light flux which has passed through a first pupil region of an image capturing optical system and a second image signal based on a light flux which has passed through a second pupil region of the image capturing optical system, the second pupil region being different from the first pupil region; an aberration information obtaining unit configured to obtain first aberration information of the image capturing optical system associated with the first pupil region and second aberration information of the image capturing optical system associated with the second pupil region; a calculation unit configured to calculate a first defocus information based on at least one of the first image signal and the second image signal; a correction unit configured to correct the first defocus information based on the first aberration information and the second aberration information to generate a second defocus information; and a distance map generation unit configured to generate a distance map based on the second defocus information.

According to another embodiment of the present invention, provided is an information processing method that includes: an image signal obtaining step of obtaining a first image signal based on a light flux which has passed through a first pupil region of an image capturing optical system and a second image signal based on a light flux which has passed through a second pupil region of the image capturing optical system, the second pupil region being different from the first pupil region; an aberration information obtaining step of obtaining first aberration information the image capturing optical system associated with the first pupil region and second aberration information of the image capturing optical system associated with the second pupil region; a calculation step of calculating a first defocus information based on at least one of the first image signal and the second image signal; a correction step of correcting the first defocus information based on the first aberration information and the second aberration information to generate a second defocus information; and a distance map generation step of generating a distance map based on the second defocus information.

Further features of the present invention will become apparent from the following description of exemplary embodiments with reference to the attached drawings.

BRIEF DESCRIPTION OF THE DRAWINGS

FIG. 9 is a flowchart illustrating an obtaining operation of BP correction information according to a second embodiment.

FIG. 16 is a diagram illustrating an example of a parallax image according to the first embodiment.

DESCRIPTION OF THE EMBODIMENTS

Preferred embodiments of the present invention will now be described in detail in accordance with the accompanying drawings. Note that, although the embodiments are illustrated to have specific, particular configurations for easier understanding and description of the invention, the present invention is not limited to these configurations. For example, although description will be provided below for the embodiments in which the present invention is applied to a single-lens reflex digital camera having a replaceable lens, the present invention is applicable to a digital camera and a video camera having a non-replaceable lens. Further, the present invention is applicable to any electronic devices having a camera. An example of any electronic devices having a camera may be a mobile phone, a personal computer (a laptop computer, a tablet computer, a desktop computer, or the like), a gaming device, and the like.

First Embodiment

Configuration of Information Processing Apparatus—Lens Unit.

Figure 2:
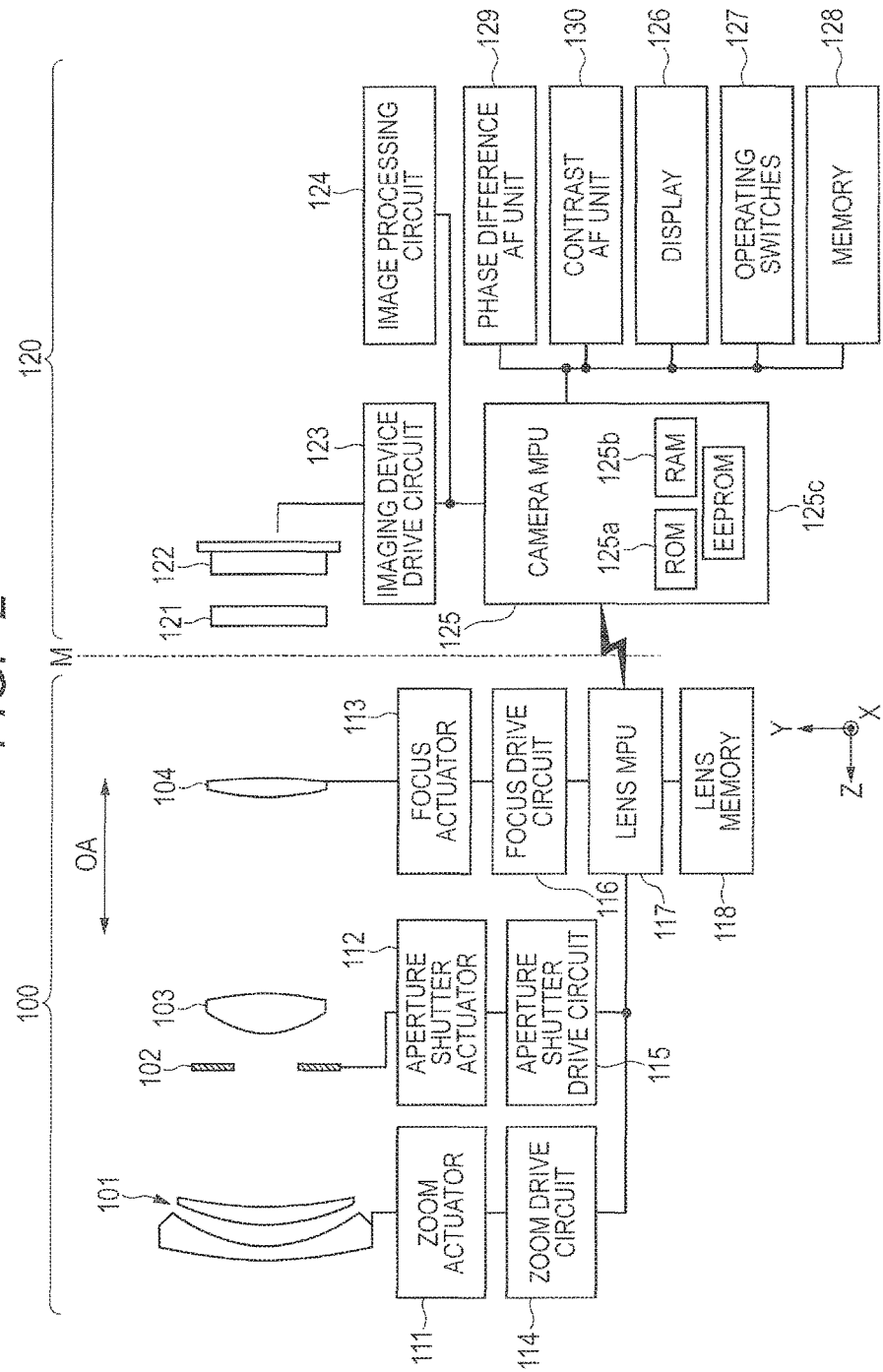
FIG. 2 is a block diagram of a digital camera that is an example of an information processing apparatus according to the first embodiment.

FIG. 2 is a block diagram illustrating an example of a functional configuration of a digital camera that is an example of an information processing apparatus according to the first embodiment. The digital camera of the present embodiment is an interchangeable-lens single-lens reflex camera and has a lens unit 100 and a camera body 120. The lens unit 100 is mounted to the camera body 120 via a mount M depicted by a dotted line in the middle of FIG. 2.

The lens unit 100 has an optical system (first lenses 101, an aperture 102, second lenses 103, and focus lenses (hereafter, simply referred to as "focus lens") 104) and a drive/control system. In such a way, the lens unit 100 includes the focus lens 104 and is an image capturing lens that forms an optical image of an object. Note that the lens unit 100 forms a control unit in the present embodiment. The first lenses 101 are arranged in the front end of a light entering section of the lens unit 100. The first lenses 101 are held movable in an optical axis direction OA. The aperture 102 has a function of adjusting the light amount at a capturing and a function of a mechanical shutter that controls the exposure time at a static image capturing. The aperture 102 and the second lenses 103 are movable in the optical axis direction OA in an integrated manner and moves themselves in response to a motion of the first lenses 101 to realize a zoom function. The focus lens 104 is also movable in the optical axis direction OA. The distance to an object to be focused (focus distance) changes in accordance with the position of the focus lens 104. The position in the optical axis direction OA of the focus lens 104 is controlled to perform a focus adjustment for adjusting a focus distance of the lens unit 100.

The drive/control system has a zoom actuator 111, an aperture shutter actuator 112, a focus actuator 113, a zoom drive circuit 114, an aperture shutter drive circuit 115, a focus drive circuit 116, a lens micro processing unit (MPU) 117, and a lens memory 118. The zoom drive circuit 114 controls a view angle of the optical system of the lens unit 100 by using the zoom actuator 111 to drive the first lenses 101 and the second lenses 103 in the optical axis direction OA. The aperture shutter drive circuit 115 controls an opening diameter and opening/closure of the aperture 102 by using the aperture shutter actuator 112 to drive the aperture 102. The focus drive circuit 116 controls the focus distance of the optical system of the lens unit 100 by using the focus actuator 113 to drive the focus lens 104 in the optical axis direction OA. Further, the focus drive circuit 116 detects the current position of the focus lens 104 by using the focus actuator 113.

The lens MPU 117 performs calculation and control related to the lens unit 100 to control the zoom drive circuit 114, the aperture shutter drive circuit 115, and the focus drive circuit 116. Further, the lens MPU 117 is connected to the camera MPU 125 via signal lines in the mount M and communicates commands and data with a camera MPU 125. For example, the lens MPU 117 obtains, from the focus drive circuit 116, information on the current position of the focus lens 104, or the like. The lens MPU 117 notifies the camera MPU 125 of lens position information in response to a request by the camera MPU 125. This lens position information includes information of the position of the focus lens 104 in the optical axis direction OA, the position in the optical axis direction OA and the diameter of an exit pupil in a state where the optical system is not moving, the position in the optical axis direction OA and the diameter of a lens frame that restricts a captured light flux through the exit pupil, or the like. Further, the lens MPU 117 controls the zoom drive circuit 114, the aperture shutter drive circuit 115, and the focus drive circuit 116 in response to a request by the camera MPU 125. In the lens memory 118, optical information that is necessary for auto focusing is pre-stored. In addition, a program or the like that is necessary for operation of the lens unit 100 may be further stored in the lens memory 118. The camera MPU 125 executes, for example, a program stored in an embedded non-volatile memory or the lens memory 118 to control the operation of the lens unit 100.

Configuration of Information Processing Device—Camera Body

The camera body 120 has an optical system (an optical low-pass filter 121 and an imaging device 122) and a drive/control system. The first lenses 101, the aperture 102, the second lenses 103, and the focus lens 104 of the lens unit 100 and the optical low-pass filter 121 of the camera body 120 form an image capturing optical system.

The optical low-pass filter 121 reduces a false color and/or a moire of a captured image. The imaging device 122 is formed of a CMOS image sensor and a peripheral circuit, and the CMOS image sensor includes an area sensor in which m pixels in the horizontal direction (X-direction) by n pixels in the vertical direction (Y-direction) (m and n each are an integer more than one) are arranged in a matrix. The imaging device 122 of the present embodiment has a pupil division function and is able to perform the phase difference AF using image data. From image data output from the imaging device 122, an image processing circuit 124 generates data used for the phase difference AF and image data used for display, recording, and the contrast AF.

The drive/control system has an imaging device drive circuit 123, the image processing circuit 124, the camera MPU 125, a display 126, operating switches 127, a memory 128, a phase difference AF unit 129, and a contrast AF unit 130.

The imaging device drive circuit 123 controls the operation of the imaging device 122, and converts an obtained image signal from an analog form into a digital form and transmits the converted image signal to the camera MPU 125. The image processing circuit 124 applies image processing such as a gamma correction, a white balance adjustment process, a color interpolation process, a compressing encoding process, or the like to image data obtained by the imaging device 122. Further, the image processing circuit 124 also generates a signal used for the phase difference AF.

The camera MPU (processor) 125 performs calculation and control related to the camera body 120. More specifically, the camera MPU 125 controls the imaging device drive circuit 123, the image processing circuit 124, the display 126, the operating switches 127, the memory 128, the phase difference AF unit 129, and the contrast AF unit 130. The camera MPU 125 is connected to the lens MPU 117 via signal lines of the mount M and communicates commands and data with the lens MPU 117. The camera MPU 125 outputs, to the lens MPU 117, a lens position obtaining request, an aperture drive request, a focus lens drive request, a zoom drive request, an obtaining request of optical information particular to the lens unit 100. A ROM 125a in which a program for controlling camera operation is stored, a RAM 125b that stores variables therein, and an EEPROM 125c that stores various parameters therein are embedded in the camera MPU 125.

The display 126 is formed of a liquid crystal display or the like and displays information on the capturing mode of the camera, a preview image before capturing, a confirmation image after a capturing, a focus state display image at focus detection, or the like. The operating switches 127 are formed of a power switch, a release (a capturing trigger) switch, a zoom operating switch, a capturing mode selection switch, or the like. A memory 128 as a recording unit of the present embodiment is a removable flash memory, for example, and records a captured image.

The phase difference AF unit 129 performs a focus detection process with the phase difference detection system by using data for focus detection obtained by the image processing circuit 124. More specifically, as data used for focus detection or data used for an image, the image processing circuit 124 generates a pair of image data formed by captured light fluxes passing through a pair of pupil regions of the image capturing optical system. The phase difference AF unit 129 detects a defocus value based on a displacement between the pair of image data. In such a way, the phase difference AF unit 129 of the present embodiment performs the phase difference AF (imaging plane phase difference AF) based on an output of the imaging device 122 without using a dedicated AF sensor. The operation of the phase difference AF unit 129 will be described later.

The contrast AF unit 130 performs a focus detection process of the contrast system based on an evaluation value for the contrast AF (contrast information of image data) generated by the image processing circuit 124. In the focus detection process of the contrast system, a position at which the evaluation value for the contrast AF becomes peak during a movement of the focus lens 104 is detected as a focused position.

In such a way, the digital camera of the present embodiment can perform both phase difference AF and contrast AF and, depending on a situation, either one of the phase difference AF and the contrast AF may be used selectively or the combination thereof may be used.

Focus Detection Operation: Phase Difference AF

Operations of the phase difference AF unit 129 and the contrast AF unit 130 will be further described below. First, the operation of the phase difference AF unit 129 will be described.

Figure 3A:
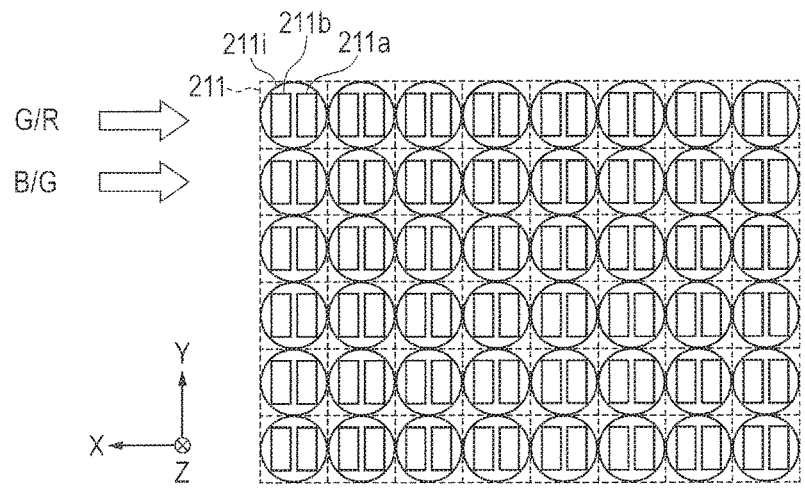
FIG. 3A and FIG. 3B are diagrams illustrating a configuration of an imaging device according to the first embodiment.

FIG. 3A is a diagram illustrating a pixel alignment of the imaging device 122 the present embodiment. FIG. 3A illustrates a view in which pixels 211 in a range of six rows in the vertical direction (Y-direction) by eight columns in the horizontal direction (X-direction) of a two-dimensional CMOS area sensor are observed from the lens unit 100 side. The imaging device 122 is provided with a color filter in the Bayer alignment. In odd-numbered rows, the pixels 211 which have a green (G) color filter and the pixels 211 which have a red (R) color filter are arranged in an alternating manner from the left in this order. In even-numbered rows, the pixels 211 which have a blue (B) color filter and the pixels 211 which have a green (G) color filter are arranged in an alternating manner from the left in this order. An on-chip micro lens 211i depicted with a circle in FIG. 3A is provided on each of the pixels 211. Further, as depicted by a rectangular in FIG. 3A, each of the pixels 211 has photoelectric conversion units 211a and 211b arranged inside the on-chip micro lens in a top view.

Each of the pixels 211 has two photoelectric conversion units 211a and 211b juxtaposed in the X-direction. In other words, each of the pixels 211 is divided into two in the X-direction. This arrangement allows for reading out image signals output from the photoelectric conversion units 211a and 211b individually and for reading out a sum of these two image signals. Further, by subtracting an image signal of one of the photoelectric conversion units from the sum of two image signals, a signal corresponding to an image signal of the other one of the photoelectric conversion units can be obtained. Image signals from individual photoelectric conversion units can be used as data utilized for the phase difference AF. An image signal from an individual photoelectric conversion unit can be also used for generating a parallax image forming a three-dimensional (3D) image. Further, the sum of the image signals can be used as normal captured image data for displaying or recording.

Calculations on a pixel signal when performing the phase difference AF will now be described. As described later, in the present embodiment, a captured exit light flux of the image capturing optical system is divided for pupils by the on-chip micro lens 211i and the divided photoelectric conversion units 211a and 211b of FIG. 3A. Then, for a plurality of pixels 211 within a predetermined range, a signal obtained by summing outputs of the photoelectric conversion units 211a is denoted as an A image used for AF, and a signal obtained by summing outputs of the photoelectric conversion units 211b is denoted as a B image used for AF. As an example, the A image used for AF and the B image used for AF utilize a pseudo brightness (Y) signal calculated by summing signals from four pixels 211 having colors of green, red, blue, and green included in a unit alignment of a color filter. However, the A image used for AF and the B image used for AF may be generated for each color of red, blue, and green. A defocus value of a predetermined region can be calculated by using a correlative operation to calculate a relative image displacement between the A image used for AF and the B image used for AF generated in the above manner.

In the present embodiment, two signals, one of which is an output signal from one of the photoelectric conversion units and the other of which is a signal corresponding to a sum of output signals from both photoelectric conversion units, are read out from the imaging device 122. For example, when a first output signal from the photoelectric conversion unit 211a and a second output signal corresponding to a sum of output signals of the photoelectric conversion units 211a and 211b are read out, an output signal of the photoelectric conversion unit 211b can be obtained by subtracting the first output signal from the second output signal described above. Thereby, both A image used for AF and B image used for AF are obtained and the phase difference AF can be realized.

Figure 3B:
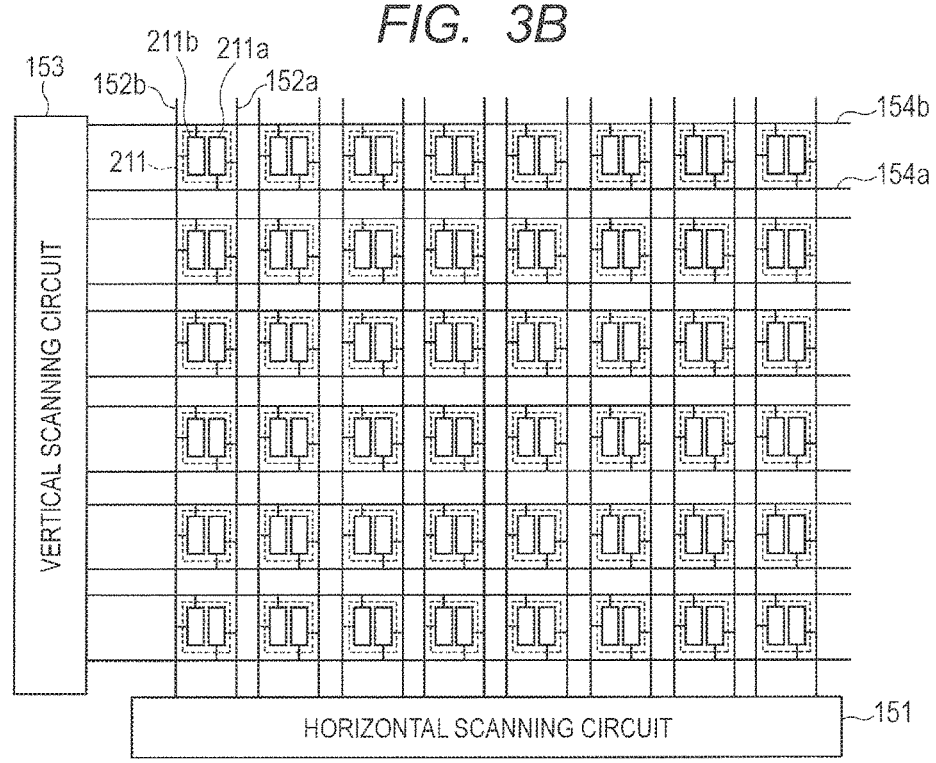

FIG. 3B is a diagram illustrating a configuration example of a readout circuit of the imaging device 122 of the present embodiment. The imaging device 122 has a horizontal scanning circuit 151 and a vertical scanning circuit 153. In the boundary portions among a plurality of pixels 211 aligned in the row direction and the column direction, horizontal scanning lines 152a and 152b are arranged along the plurality of pixels 211 aligned in the column direction, and vertical scanning lines 154a and 154b are arranged along the pixels 211 aligned in the row direction. The vertical scanning line 154a on each row connects the vertical scanning circuit 153 to a plurality of photoelectric conversion units 211a on the associated row. The vertical scanning line 154b on each row connects the vertical scanning circuit 153 to a plurality of photoelectric conversion units 211b on the associated row. The horizontal scanning line 152a on each column connects the horizontal scanning circuit 151 to a plurality of photoelectric conversion units 211a on the associated column. The horizontal scanning line 152b on each column connects the horizontal scanning circuit 151 to a plurality of photoelectric conversion units 211b on the associated column. The vertical scanning circuit 153 transmits control signals to respective pixels 211 via the vertical scanning lines 154a and 154b and controls readout of signals and the like. The horizontal scanning circuit 151 reads out signals from respective pixels 211 via the horizontal scanning lines 152a and 152b.

Note that the imaging device 122 of the present embodiment can read out signals in the following two readout modes. The first readout mode is an all-pixel readout mode for capturing a high definition static image. In the all-pixel readout mode, signals from all the pixels 211 included in the imaging device 122 are read out.

The second readout mode is a reduced readout mode for only recording a motion image or displaying a preview image. In the application for recording a motion image or displaying a preview image, a required resolution is lower than that in the case of capturing a high definition static image. Therefore, in the case of these applications, since signals are not required to be read out from all the pixels included in the imaging device 122, operation is performed in the reduced readout mode for reading out signals from only a part of the pixels reduced at a predetermined ratio. Further, when a high speed readout is required in an application other than the above-described applications, the reduced readout mode is used in a similar manner. An example of reduction may be a process that sums signals from a plurality of pixels to improve the S/N ratio when reduction is applied in the X-direction and ignores signal outputs of reduced rows when reduction is applied in the Y-direction. Performing the phase difference AF and the contrast AF based on signals read out in the second readout mode allows for a high speed process.

Figure 4A:
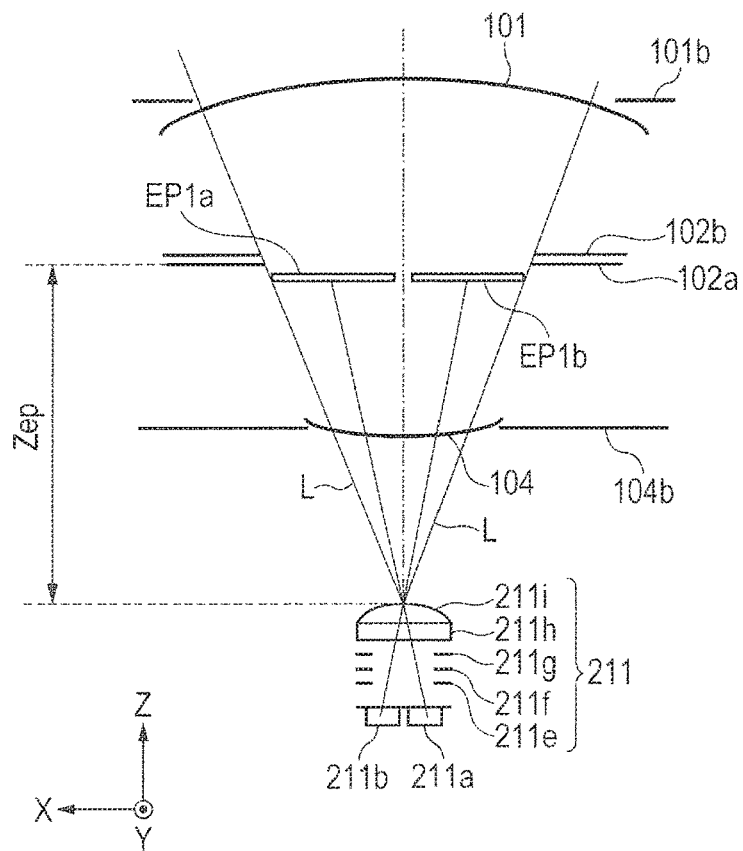
FIG. 4A and FIG. 4B are diagrams illustrating the structure of an image capturing optical system according to the first embodiment.
Figure 4B:
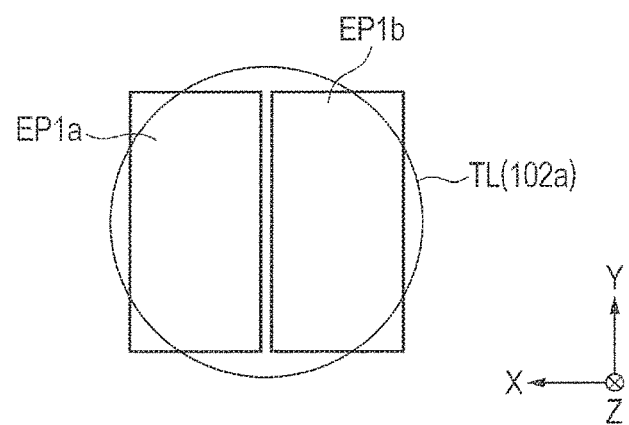

FIG. 4A and FIG. 4B are structure diagrams of the image capturing optical system in the present embodiment. With reference to FIG. 4A and FIG. 4B, described will be a conjugate relationship between an exit pupil plane of the image capturing optical system and a photoelectric conversion unit of an imaging device arranged at zero image height, that is, arranged close to the center of an image plane. The photoelectric conversion units 211a and 211b within the imaging device and the exit pupil plane of the image capturing optical system are designed so as to be in a conjugate relationship by the on-chip micro lens 211i. In general, the exit pupil plane of the image capturing optical system substantially matches a plane on which an iris diaphragm used for light amount adjustment is placed. On the other hand, the image capturing optical system of the present embodiment is a zoom lens having a zoom function, and thus a zooming operation may cause a change in the distance from an image plane and a size of the exit pupil in some types of an image capturing optical system. FIG. 4A illustrates a state where the focus distance of the lens unit 100 is located in the middle of a wide-angle end and a telephoto end. An exit pupil plane distance Zep in this state is a reference value, and an eccentric parameter is optimally designed in accordance with the shape and the image height (X and Y coordinates) of the on-chip micro lens.

FIG. 4A illustrates an X-Z cross section of the image capturing optical system. The first lenses 101, a lens-barrel member 101b, an opening plate 102a, aperture blades 102b, a focus lens 104, and a lens-barrel member 104b are depicted as a portion corresponding to the lens unit 100. The lens-barrel member 101b is a member that holds the first lenses 101. The opening plate 102a is a member that defines the opening diameter when the aperture is opened. The aperture blades 102b are members that adjust the opening diameter when the aperture is being closed. The lens-barrel member 104b is a member that holds the focus lens 104. Depiction of the second lenses 103 illustrated in FIG. 2 is omitted in FIG. 4A.

Note that the lens-barrel member 101b, the opening plate 102a, the aperture blades 102b, and the lens-barrel member 104b serve as restriction members to a light flux passing through the image capturing optical system. The lens-barrel member 101b, the opening plate 102a, the aperture blades 102b, and the lens-barrel member 104b depicted in FIG. 4A schematically illustrate an optical virtual image when observed from an image plane, and do not necessarily illustrate the actual structure. Further, a synthetic aperture near the aperture 102 is defined as an exit pupil of a lens, and the distance from an image plane is denoted as Zep as described above.

The pixel 211 is arranged near the center of an image plane. The pixel 211 has respective members of the photoelectric conversion units 211a and 211b, wiring layers 211e, 211f, and 211g, a color filter 211h, and the on-chip micro lens 211i in this order from the bottom layer. Two photoelectric conversion units 211a and 211b are then projected on the exit pupil plane of the image capturing optical system by the on-chip micro lens 211i. In other words, the exit pupil of the image capturing optical system is projected on the surface of the photoelectric conversion units via the on-chip micro lens 211i.

FIG. 4B illustrates projected images of the photoelectric conversion units 211a and 211b on the exit pupil plane of the image capturing optical system. In FIG. 4B, projected images for the photoelectric conversion units 211a and 211b are depicted as pupil regions EP1a and EP1b, respectively. As described above, the pixel 211 can output a signal from either one of the two photoelectric conversion units 211a and 211b and a sum of signals from the two photoelectric conversion units 211a and 211b. The sum of the signals from the two photoelectric conversion units 211a and 211b corresponds to a signal based on light fluxes passing through both regions of the pupil regions EP1a and EP1b, that is, substantially the entire pupil region (pupil region TL) of the image capturing optical system. In such a way, the photoelectric conversion units 211a and 211b of the present embodiment form a pupil-divided pixel.

In FIG. 4A, the outermost portion of the light flux passing through the image capturing optical system is depicted as a line segment L. In the arrangement of FIG. 4A, the position of the line segment L is determined by the position of the end of the opening plate 102a of the aperture 102. Therefore, as illustrated in FIG. 4A, there is substantially no vignetting due to the image capturing optical system in projected images corresponding to the pupil regions EP1a and EP1b. In FIG. 4E, the outermost portion of the light flux on the exit pupil plane of FIG. 4A is depicted by a circle labeled with TL (102a). As illustrated in FIG. 4A, it can be observed that there is substantially no vignetting, as can be seen from the fact that the substantial portion of the pupil regions EP1a and EP1b corresponding to the projected images of the photoelectric conversion units 211a and 211b is included within the circle. Since the light flux passing through the image capturing optical system is restricted by only the opening plate 102a of the aperture, this circle corresponds to the opening portion of the opening plate 102a. In the middle of the image plane, vignettings of the pupil regions EP1a and EP1b corresponding to respective projected images are symmetric with respect to the optical axis. Thus, the light amounts received by the photoelectric conversion units 211a and 211b are the same as each other.

When performing the phase difference AF, the camera MPU 125 controls the imaging device drive circuit 123 so as to read out two types of output signals described above from the imaging device 122. At this time, the camera MPU 125 provides information indicating a focus detection region to the image processing circuit 124. Furthermore, the camera MPU 125 provides an instruction to generate data of the A image used for AF and the B image used for AF from the output signals of the pixels 211 included within the focus detection region and supply the data to the phase difference AF unit 129. The image processing circuit 124 generates data of the A image used for AF and the B image used for AF according to this instruction and outputs the data to the phase difference AF unit 129. The image processing circuit 124 further supplies RAW image data to the contrast AF unit 130.

As described above, the imaging device 122 has a function that can perform the phase difference AF and the contrast AF. In other words, the imaging device 122 forms a part of the focus detection apparatus for both phase difference AF and contrast AF.

Note that, although the configuration in which an exit pupil is divided into two in the horizontal direction (X-direction) has been described here as an example, an exit pupil corresponding to a part of or all of the pixels of the imaging device 122 may be divided into two in the vertical direction (Y-direction). Further, for example, four photoelectric conversion units may be arranged in the pixel 211, and thereby an exit pupil may be divided into both directions of the horizontal direction and the vertical direction. Providing the pixels 211 each having an exit pupil divided in the vertical direction as described above allows for the phase difference AF which is adaptive to an object contrast not only in the horizontal direction but also in the vertical direction.

Focus Detection Operation: Contrast AF

Next, the contrast AF will be described by using FIG. 5. The contrast AF is realized by the camera MPU 125 and the contrast AF unit 130 cooperating to repeat drive of the focus lens 104 and calculation of an evaluation value.

Figure 5:
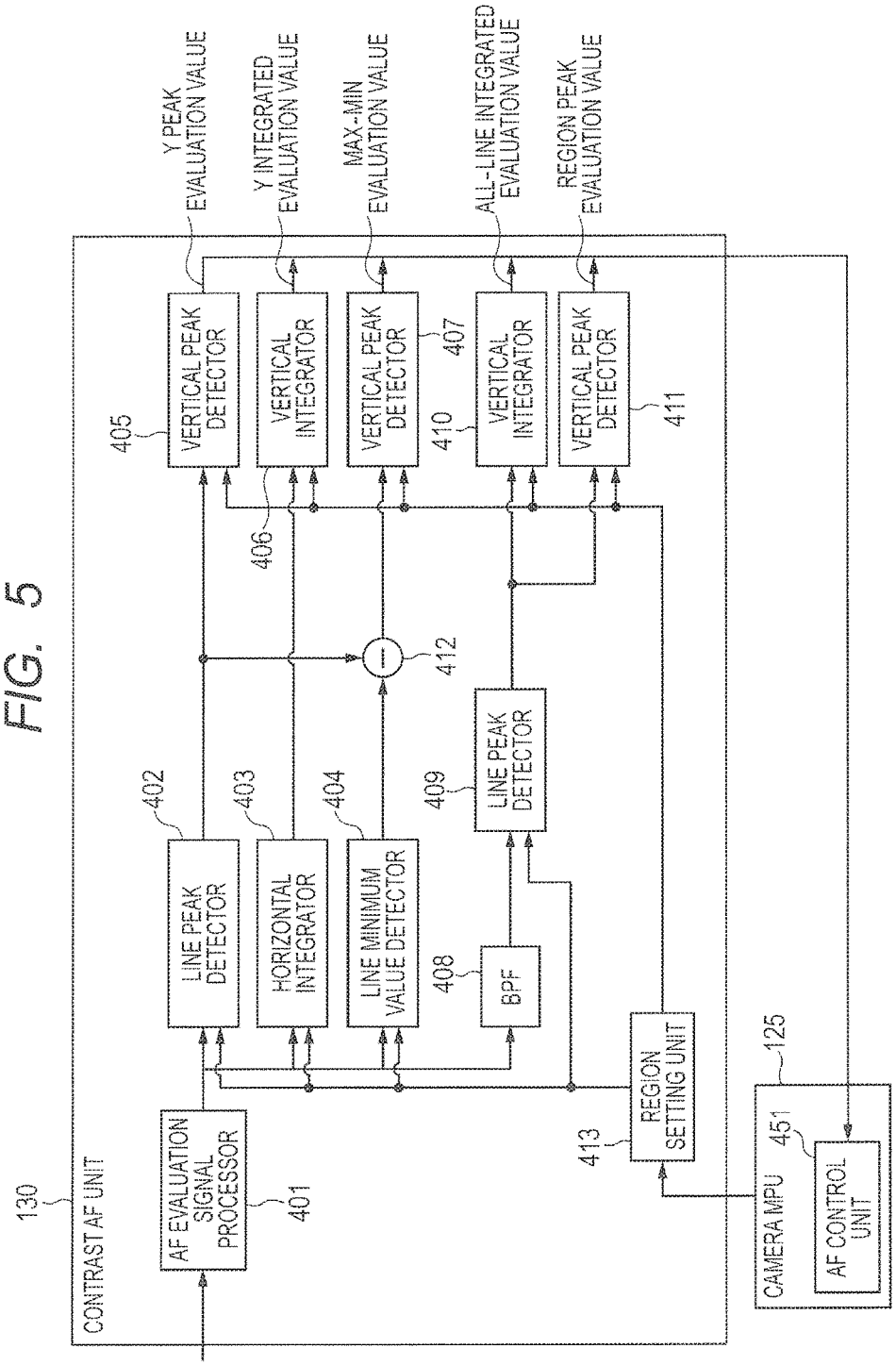
FIG. 5 is a block diagram illustrating a configuration of a contrast AF unit according to the first embodiment.

FIG. 5 is a block diagram illustrating a configuration or the contrast AF unit 130 and a configuration of the camera MPU 125 cooperating with the contrast AF unit 130 according to the first embodiment. The contrast AF unit 130 has an AF evaluating signal processor a line peak detector 402, a horizontal integrator 403, a line minimum value detector 404, a vertical peak detector 405, a vertical integrator 406, and a vertical peak detector 407. The contrast AF unit 130 further has a band pass filter (BPF) 408, a line peak detector 409, a vertical integrator 410, a vertical peak detector 411, a subtractor 412, and a region setting unit 413. The camera MPU 125 has an AF control unit 451.

When RAW image data is input from the image processing circuit 124 to the contrast AF unit 130, the RAW image data is first input to the AF evaluating signal processor 401. The AF evaluating signal processor 401 extracts green (G) signals from Bayer alignment signals within RAW image data and performs a gamma correction process that emphasizes a low brightness component and suppresses a high brightness component. Although a case where the contrast AF is performed by using green (G) signals is described in the present embodiment, another color signal may be used or all the red (R), blue (B), and green (G) signals may be used. Further, the contrast AF may be performed by using a brightness signal after all the colors of red (R), blue (B), green (G) are used to generate the brightness (Y) signal. In the following description, an output signal generated by the AF evaluating signal processor 401 is referred to as a brightness signal Y regardless of the types of used signals. The AF evaluating signal processor 401 outputs the brightness signal Y to the line peak detector 402, the horizontal integrator 403, the line minimum value detector 404, and the BPF 408. The timing at which the brightness signal Y is input to each of these sections is controlled so as to match the timing at which each evaluation value described later is to be generated.

The camera MPU 125 outputs information on a setting of a focus detection region to the region setting unit 413. The region setting unit 413 generates a gate signal used for selecting a signal within a set region. The gate signal is input to each of the line peak detectors 402 and 409, the horizontal integrator 403, the line minimum value detector 404, the vertical integrators 406 and 410, and the vertical peak detectors 405, 407, and 411. Note that the region setting unit 413 can select a plurality of regions in accordance with a setting of a focus detection region.

A calculation scheme of a Y peak evaluation value will be described. The brightness signal Y after subjected to a gamma correction by the AF evaluating signal processor 401 is input to the line peak detector 402. The line peak detector 402 calculates a Y line peak value for each horizontal line within a focus detection region and outputs the Y line peak value to the vertical peak detector 405. The vertical peak detector 405 applies a peak holding operation in the vertical direction within a focus detection region to the Y line peak value output from the line peak detector 402 to generate a Y peak evaluation value. A Y peak evaluation value is an effective index in determination of a high brightness object and a low brightness object.

A calculation scheme of integration evaluation value will be described. The brightness signal Y after subjected to a gamma correction by the AF evaluating signal processor 401 is input to the horizontal integrator 403. The horizontal integrator 403 calculates integrated value of Y on a horizontal line basis within a focus detection region and outputs the integrated value of Y to the vertical integrator 406. The vertical integrator 406 generates a Y integration evaluation value by integrating integrated values calculated by the horizontal integrator 403 in the vertical direction within a focus detection region. A Y integration evaluation value can be used as an index for determining the brightness of the entire focus detection region.

A calculation scheme of a Max-Min evaluation value will be described. The brightness signal Y after subjected to a gamma correction by the AF evaluating signal processor 401 is input to the line minimum value detector 404. The line minimum value detector 404 calculates a Y line minimum value on a horizontal line basis within the focus detection region and outputs the Y line minimum value to the subtractor 412. Further, a Y line peak value calculated by the line peak detector 402 by using the same calculation scheme as that for the Y peak evaluation value described above input to the subtractor 412. The subtractor 412 subtracts the Y line minimum value from the Y line peak value and outputs the subtracted value to the vertical peak detector 407. The vertical peak detector 407 applies a peak-holding to an output from the subtractor 412 within a focus detection region in the vertical direction to Generate a Max-Min evaluation value. A Max-Min evaluation value is an effective index in determination of a low contrast and a high contrast.

A calculation scheme of a region peak evaluation value will be described. The brightness signal Y after subjected to a gamma correction by the AF evaluating signal processor 401 is input to the BPF 408. The BPF 408 extracts a particular frequency component the brightness signal Y to generate a focus signal and outputs the focus signal to the line peak detector 409. The line peak detector 409 calculates a line peak value on a horizontal line basis within a focus detection region and outputs the line peak value to the horizontal peak detector 411. The vertical peak detector 411 applies a peak-holding within a focus detection region to the line peak value output from the line peak detector 409 to generate a region peak evaluation value. Since little change in the region peak evaluation value is caused by a motion of an object within a focus detection region, the region peak evaluation value is an effective index in restart determination for determining whether or not to transfer to a process of again searching a focus point from a focused state.

A calculation scheme of an all-line integration evaluation value will be described. In a similar manner to the calculation scheme of the region peak evaluation value, the line peak detector 409 calculates a line peak value on a horizontal line basis within a focus detection region and outputs the line peak value to the vertical integrator 410. The vertical integrator 410 integrates line peak values output from the line peak detector 409 for all the horizontal scanning lines in the vertical direction within a focus detection region to generate an all-line integration evaluation value. An all-line integration evaluation value has a wide dynamic range due to the integration effect and a high sensitivity and therefore is a primary AF evaluation value in a focus detection process. Therefore, an all-line integration evaluation value is mainly used for the contrast AF of the present embodiment.

The AF control unit 451 of the camera MPU 125 obtains a Y peak evaluation value, a Y integration evaluation value, a Max-Min evaluation value, a region peak evaluation value, and an all-line integration evaluation value. The AF control unit 451 instructs the lens MPU 117 to move the focus lens 104 by a predetermined amount in a predetermined direction along the optical axis direction. Then, respective evaluation values described above are again calculated based on image data newly obtained after the movement of the focus lens 104. Repetition of the above process leads to detection of a focus lens position at which the all-line integration evaluation value becomes the maximum.

In the present embodiment, information of two directions of the horizontal line direction and the vertical line direction is used for calculation of various evaluation values. This allows for focus detection which is adaptive to object contrast information of two orthogonal directions of the horizontal direction and the vertical direction.

Focus Detection Region and Distance Map Detection Region.

Figures 6A, 6B:
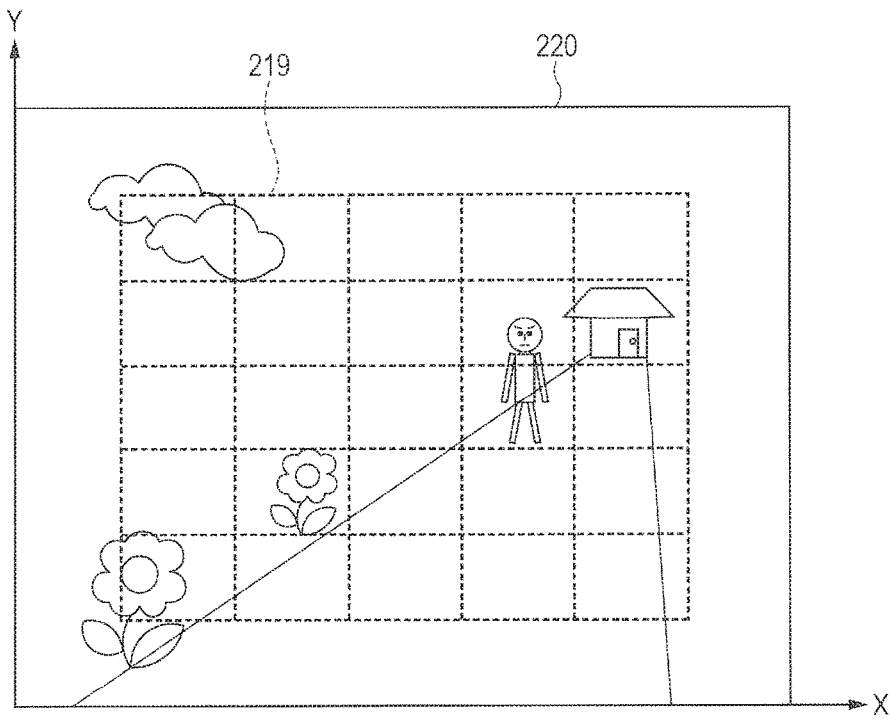
FIG. 6A and FIG. 6B are diagrams illustrating an example of focus detection regions according to the first embodiment.

FIG. 6A and FIG. 6B are diagrams illustrating an example of a focus detection region 219 within a capturing range 220. FIG. 6A is a diagram illustrating the focus detection region 219 arranged within the capturing range 220. As described above, each of the phase difference AF and the contrast AF is performed based on a signal obtained from the pixels 211 corresponding to the focus detection region 219. The focus detection region 219 may include a plurality of focus detection regions of five rows by five columns. Note that, with respect to a distance map detection region described later, regions can also be set in a similar manner to the focus detection regions 219. Therefore, reference numerals that are common to the focus detection region used in the description for the distance map detection region, and description common to these regions will be omitted or simplified.

FIG. 6B illustrates focus detection regions 219 (1, 1) to 219 (5, 5). Numerals in the parenthesis represent a row number and a column number within the focus detection regions 219. In the example illustrated in FIG. 6A and FIG. 6B, the focus detection regions 219 (1, 1) to 219 (5, 5) are set in 25=5×5 frames. However, the number, the position, and the size of focus detection regions are not limited to what is depicted.

Flows of AF Process and Distance Map Generation

Figure 1:
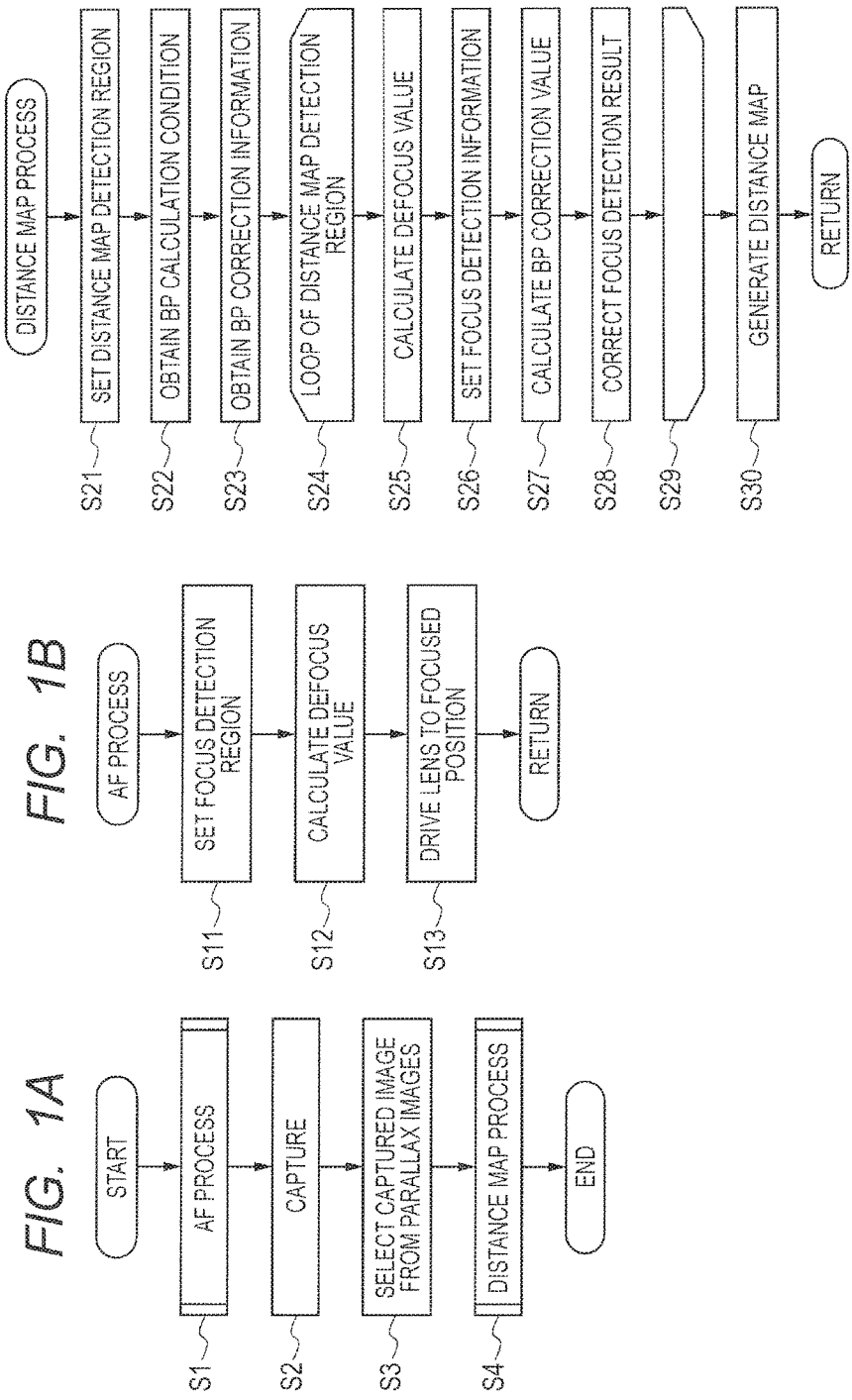
FIG. 1A, FIG. 1B, and FIG. 1C are flowcharts illustrating a distance map generating operation according to a first embodiment.

Next, with reference to FIG. 1A, FIG. 1B, and FIG. 1C, flows of an AF process and a distance map generating operation that may be performed in a digital camera and an accessory application of the present embodiment will be described.

A main flow of the present embodiment will be described by using FIG. 1A. At step S1, the camera MPU 125 performs the phase difference AF or the contrast AF to calculate defocus values in a plurality of focus detection regions. The camera MPU 125 moves the focus lens 104 to a focus position of an object based on a defocus value of representative coordinates of the plurality of focus detection regions. Details of the AF process will be described by using FIG. 1B.

At step S2, the camera MPU 125 instructs respective elements of an imaging apparatus to capture and record a captured image at the position of the focus lens 104 that has moved at step S1. This process causes a parallax image to be generated. A parallax image means a captured image generated based on an image signal (second image signal) that is based on light fluxes that have passed through the pupil regions EP1a and EP1b illustrated in FIG. 1A and FIG. 4B and entered the photoelectric conversion units 211a and 211b of a pupil divided pixel. Further, in the process of step S2, a usual captured image (hereafter, referred to as parallax image A+B) may also be generated. In this readout operation, an image signal corresponding to the pupil region TL is read out. The parallax image A is an image resulted from an image signal (second image signal) that is based on the photoelectric conversion unit 211a corresponding to the pupil region EP1a (second pupil region). The parallax image B is an image resulted from an image signal (second image signal) that is based on the photoelectric conversion unit 211b corresponding to the pupil region EP1b (second pupil region). A usual captured image is an image resulted from an image signal (first image signal) that is based on the photoelectric conversion units 211a and 211b corresponding to the pupil region TL (first pupil region).

A plurality of image signals (or a plurality of parallax images) obtained by the imaging apparatus at step S2 are recorded in a memory such as the memory 128. The above data is obtained by the camera MPU 125 that operates as an image signal obtaining unit in the following steps and is used in the following process.

FIG. 16 represents an example of the parallax image A, the parallax image B, and the parallax image A+B. The parallax image A, the parallax image B, and the parallax image A+B are images whose parallax and depth of field are different in accordance with the corresponding pupil region. The parallax image A and the parallax image B are different in a view of overlapping (occlusion) of flowers 501 in the front and a house 502 in the back due to a parallax. The depth of field is different between the parallax images A and B and the parallax image A+B and, in particular, blur occurs around the house 502 in the back in the parallax image A+B.

At step S3, the camera MPU 125 operates as a captured image generating unit to generate a captured image by selecting one or more parallax images to be left as captured images from a plurality of parallax images obtained at step S2. The selection scheme here may be determined based on a user designation, or may be selected automatically in an application. As an example, when a captured image is automatically selected, the camera MPU 125 analyzes a parallax image and, from the analysis result, selects images from a plurality of generated parallax images based on a predetermined standard. An example of the predetermined standard can be a standard of selecting an image having the highest contrast, a standard of selecting an image having the greatest number of edges (the least occlusion) by using edge detection of an object, or the like. In processes on and after step S4, although a case where a single captured image is selected at step S3 is described, a plurality of parallax images may be recorded as captured images at step S3. In this case, the operation of step S4 is repeated for the number of captured images.

At step S4, the camera MPU 125 operates as a distance map generating unit to perform a process of distance map generation. At step S4, an application that allows a user to recognize the object distance of a captured image can be provided by displaying or recording distance map information attached to a captured image selected at step S3. With calculation of a defocus value in each distance map detection region corresponding to a captured image and calculation of a correction value corresponding thereto, generation of an accurate distance map is realized. Details of the operation of step S4 will be described later by using FIG. 1C.

Details of the above AF process will be described below by using a flowchart illustrated in FIG. 1B. The following AF process operations are performed by the camera MPU 125 as an operating subject unless otherwise explicitly stated. Further, also in a case where the camera MPU 125 transmits a command or the like to the lens MPU 117 to drive and/or control the lens unit 100, an operating subject may be denoted as the camera MPU 125 to simplify the description.

At step S11, the camera MPU 125 sets one or more focus detection regions 219. One or more focus detection regions 219 set in this step may be a preset region such as illustrated in FIG. 6A and FIG. 6B, or may be a region determined by detected coordinates of a primary object. For example, a face of a person can be detected in the focus detection region 219 (2, 4) in the example of FIG. 6A and FIG. 6B. When the face of the person is a primary object, the region 219 (2, 4) can be a focus detection region.

In this example, representative coordinates (x1, y1) of a plurality of focus detection regions are set to the focus detection region. For example, the representative coordinates (x1, y1) may be the centroid coordinates to the focus detection region 219.

At step S12, a defocus value DEF is calculated as a focus detection result with respect to the focus detection region set at step S11. The defocus value DEF can be calculated by the focus detection operation described above. Further, the camera MPU 125 which performs this operation forms a defocus value calculation unit.

At step S13, the camera MPU 125 moves the focus lens 104 to a focus position of an object based on the defocus value at the representative coordinates (x1, y1) in the plurality of focus detection regions calculated at step S12.

Next, details of the above distance map generating process will be described by using a flowchart illustrated in FIG. 1C.

At step S21, the camera MPU 125 sets a plurality of distance map detection regions 219 (x, y) at the distance map generation as seen in FIG. 6A and FIG. 6B. The plurality of focus detection regions 219 (x, y) set here may be regions that have been set in advance as seen in FIG. 6A or may be regions that are determined by detected coordinates of a primary object. For example, in the example of FIG. 6A and FIG. 6B, a person that is the object can be detected in the distance map detection regions 219 (2, 4) and 219 (3, 4).

Figure 7A:
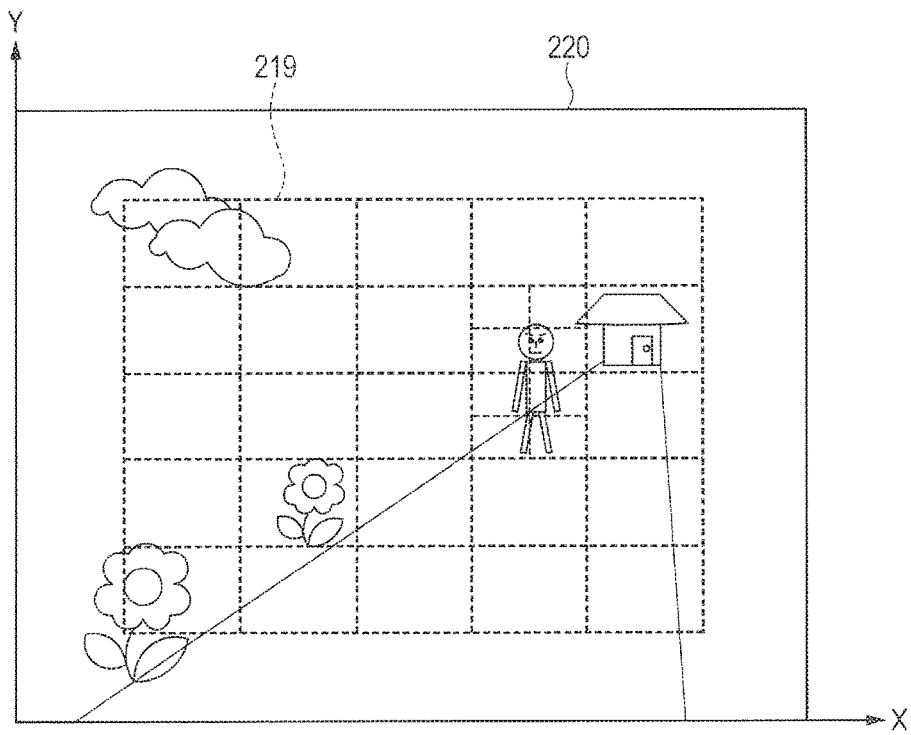
FIG. 7A and FIG. 7B are diagrams illustrating another example of focus detection regions according to the first embodiment.
Figure 7B:
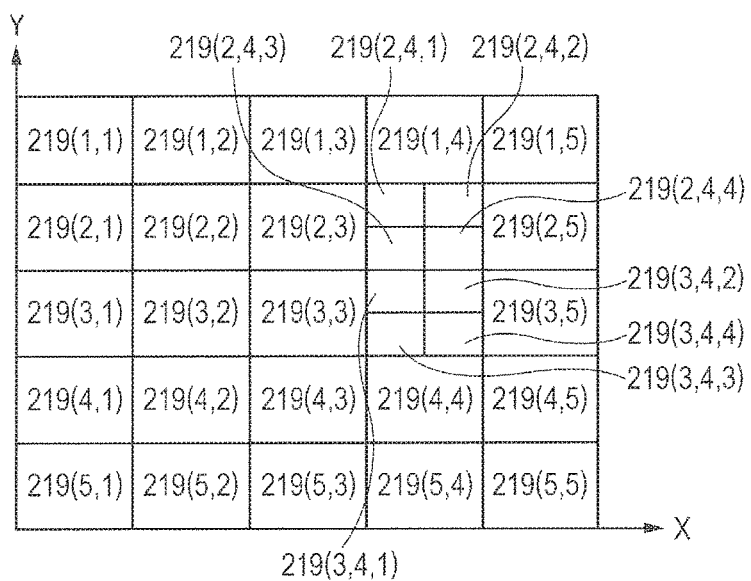

Note that, as illustrated in FIG. 7A and FIG. 7B as a modified example, finer distance map detection regions may be set for the distance map detection regions 219 (2, 4) and 219 (3, 4) where a person that is the primary object is present. In FIG. 7A and FIG. 7B, the distance map detection region 219 (2, 4) is divided into four distance map detection regions 219 (2, 4, 1), 219 (2, 4, 2), 219 (2, 4, 3), and 219 (2, 4, 4). In a similar manner, the distance map detection region 219 (3, 4) is divided into four distance map detection regions 219 (3, 4, 1), 219 (3, 4, 2), 219 (3, 4, 3), and 219 (3, 4, 4). This method allows a high definition distance map to be generated.

At step S22, the camera MPU 125 obtains a parameter (calculation condition) necessary for calculating a BP correction value. A BP correction value is a value for correcting a focus detection error that may be caused by a design-based optical aberration and a manufacturing error of the image capturing optical system. A BP correction value varies due to a change in the image capturing optical system and the focus detection optical system such as the position of the focus lens 104, the position of the first lenses 101 indicating a zoom state, position coordinates (x, y) of the distance map detection region 219, or the like. Therefore, at step S2, the camera MPU 125 obtains information of the position of the focus lens 104, the position of the first lenses 101 indicating a zoom state, position coordinates (x, y) of the distance map detection region 219, or the like, for example.

At step S23, the camera MPU 125 operates as an aberration information obtaining unit to obtain BP correction information. The BP correction information as used herein to information representing an aberration state of the optical (aberration information), which information on the color of an object (color of incident light), the direction of the object, and a captured position in the image capturing optical system for each space frequency, for example.

Figure 12:
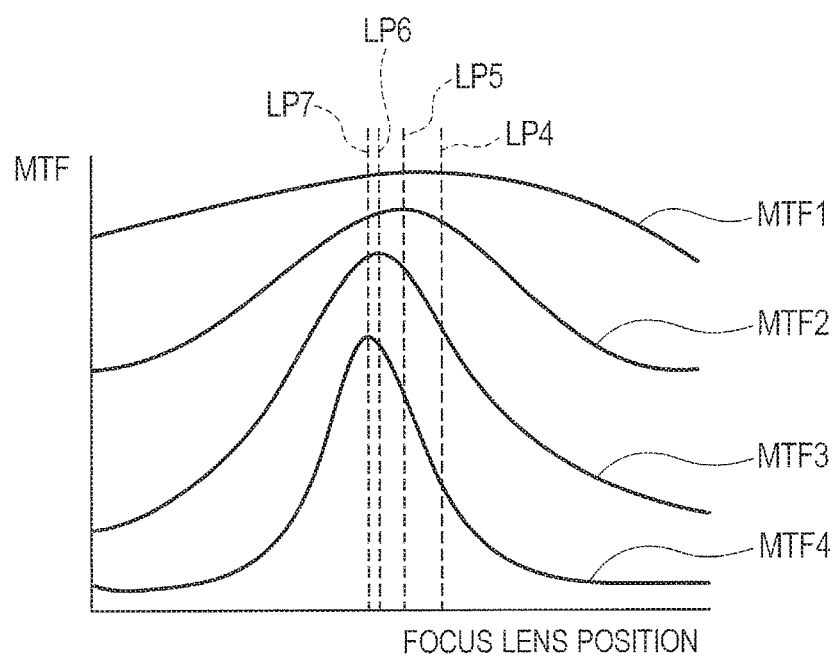
FIG. 12 is a graph illustrating defocus MTFs of an image capturing optical system according to the first embodiment.
Figure 13A:
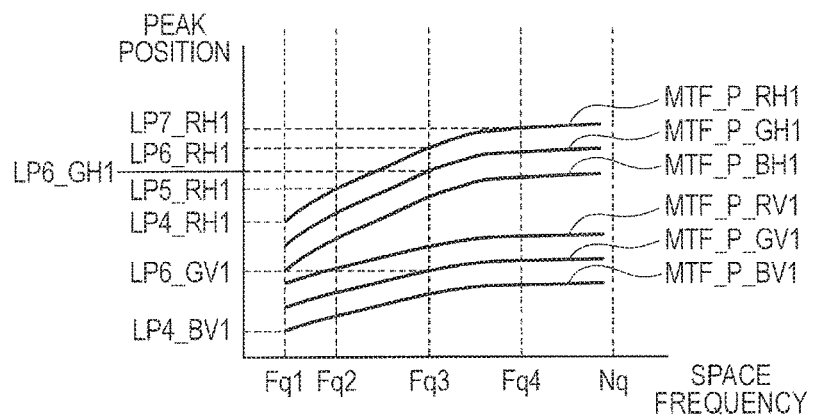
FIG. 13A, FIG. 13B, and FIG. 13C are graphs illustrating relationships between peak positions and space frequencies of defocus MTFs according to the first embodiment.
Figure 13B:
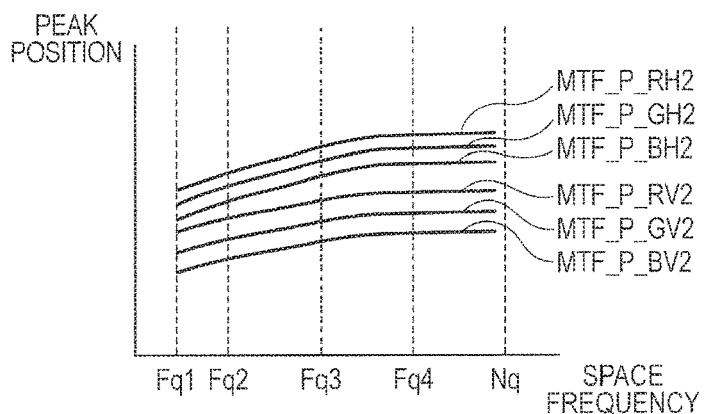
Figure 13C:
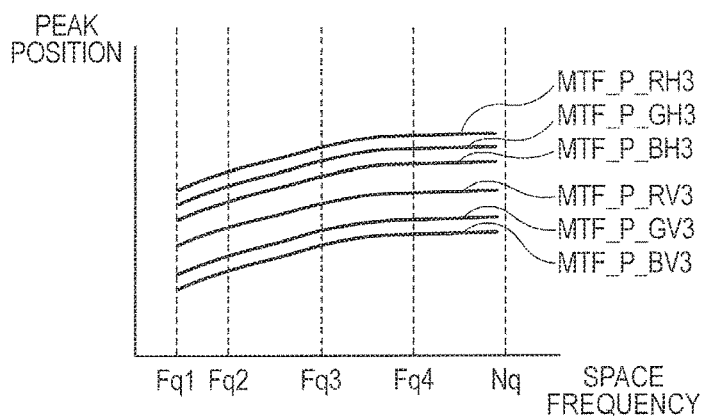

With reference to FIG. 12, FIG. 13A, FIG. 13B, and FIG. 13C, an example of BP correction information corresponding to space frequencies stored in the lens memory 118 or the like will be described. FIG. 12 is a graph illustrating defocus modulation transfer functions (MTF) of the image capturing optical system. The horizontal axis represents the position of the focus lens 104, and the vertical axis represents the intensity of the MTFs. Four curves depicted in FIG. 12 (MTF1, MTF2, MTF3, MTF4) are defocus MTF curves corresponding to four space frequencies. Four defocus MTF curves represent a case where the space frequency varies from a lower frequency to a higher frequency in the order of MTF1, MTF3, and MTF4. The defocus MTF curve of a space frequency Fq1 (lp/mm) corresponds to MTF1 and, in a similar manner, the defocus MTF curves of space frequencies Fq2, Fq3, and Fq4 (lp/mm) correspond to MTF2, MTF3, and MTF4, respectively. Further, LP4, LP5, LP6, and LP7 represent the positions of the focus lens 104 at which the defocus MTF curves MTF1, MTF2, MTF3, and MTF4 become respective maximum values. Note that a space frequency Nq in FIG. 13A to FIG. 13C represents a Nyquist frequency depending on a pixel pitch of the imaging device 122.

FIG. 13A, FIG. 13B, and FIG. 13C illustrate examples of BP correction information in the present embodiment. FIG. 13A is a graph illustrating a relationship between positions (peak positions) of the focus lens 104 at which each defocus MTF of FIG. 12 becomes maximum and space frequencies. Six curves represented by MTF_P_RH1, ..., MTF_P_BV1 are resulted from different combinations of a color and a direction. Subscripts (R, G, B) represent colors (red, green, blue), respectively, and subscripts (H, V) represent directions (horizontal, vertical), respectively. For example, a curve MTF_P_RH1 corresponding to a case where the color is red and the direction is horizontal is expressed in the following equation:

$$\text{MTF\_P\_RH}(f, x, y) = (rh(0) \times x + rh(1) \times y + rh(2)) \times f^2 + \quad (1)$$
$$(rh(3) \times x + rh(4) \times y + rh(5)) \times f + (rh(6) \times x + rh(7) \times y + rh(8))$$

where a space frequency f and position coordinates (x, y) of the distance map detection regions 219 are variables and rh(n) (n is an integer from 0 to 8) is a coefficient.

In the present embodiment, rh(n) is pre-stored in the lens memory 118 of the lens unit 100 as BP correction information, for example. At step S23, the camera MPU 125 requests the lens MPU 117 to obtain rh(n) from the lens memory 118. However, rh(n) may be stored in a non-volatile field of the RAM 125b. In this case, at step S23, the camera MPU 125 obtains rh(n) from the RAM 125b.

Other curves can also be expressed by equations similar to Equation (1). Coefficients associated with combinations of red and vertical (MTF_P_RV), green and horizontal (MTF_P_GH), green and vertical (MTF_P_GV), blue and horizontal (MTF_P_BH), and blue and vertical (MTF_P_BV) are defined as (rv, gh, gv, bh, and bv), respectively. These coefficients are also stored in the lens memory 118 in a similar manner and obtained in response to a request by the camera MPU 125.

In the present embodiment, multiple pieces of BP correction information corresponding to respective pupil regions are stored in the lens memory 118. As described above, according to FIG. 4A and FIG. 4B, a pupil region corresponding to the photoelectric conversion unit 211a is denoted as EP1a and a pupil region corresponding to the photoelectric conversion unit 211b is denoted as EP1b. Further, a pupil region corresponding to a sum of the photoelectric conversion units 211a and 211b is denoted as TL. FIG. 13A corresponds to the BP correction information BP_TL (first aberration information) of the pupil region TL. FIG. 13B corresponds to the BP correction information BP_A (second aberration information) of the pupil region EP1a. FIG. 13C corresponds to the BP correction information BP_B (second aberration information) of the pupil region EP1b.

The camera MPU 125 selects BP correction information corresponding to a pupil region of a captured image used at focus detection, recording, or viewing. For example, when the contrast AF is performed by using a captured light flux which has passed through the entire exit pupil plane, the BP correction information BP_TL is selected as BP correction information used for focus detection. On the other hand, when a signal corresponding to only the photoelectric conversion unit 211a is read out as a captured image in order to obtain the parallax image A, the BP correction information BP_A corresponding to the photoelectric conversion unit 211a is selected. A pupil region selected for focus detection is determined at step S1 described above and a pupil region used for a captured image is determined in the operation of step S3, and thus BP correction information corresponding to the process described above is selected at these steps.

In such a way, BP correction information is held in advance for each associated pupil region and BP correction information is selectively used in accordance with an associated pupil region at focus detection and capturing, which allows for correction taking into account of a difference in the aberration for each pupil region. This allows for accurate BP correction and distance map creation. Although the number of pupil divisions is two in the present embodiment and the direction of pupil divisions is the horizontal direction (X-direction), without being limited thereto, the number and the direction of pupil divisions may be changed.

Further, in order to reduce the amount of BP correction information stored in the lens memory 118, when selected pupil regions are close to each other or symmetric, BP correction information common to the selected pupil regions may be used. For example, due to symmetrically positioned pupil regions, the BP correction information BP_A and the BP correction information BP_B have similar characteristics when the manufacturing error is not so large. In such a case, the BP correction information BP_B may be replaced with the BP correction information BP_A.

As seen in the present embodiment, pieces of BP correction information are expressed as functions, and coefficients of respective terms are pre-stored as BP correction information, and thereby the data amount stored in the lens memory 118 or the RAM 125b can be reduced compared to the case of original numerical data being stored. Further, it is possible to adapt to a change in an image capturing optical system and a focus detection optical system. Furthermore, pieces of BP correction information associated with a plurality of distance map detection regions of the present embodiment can be obtained by calculation without requiring to store them individually.

At step S24, the process enters a loop process in which the process from step S25 to step S28 is repeated multiple times for each of the distance map detection regions 219 set at step S21. Specifically, 25 distance map detection regions 219 are set as illustrated in FIG. 6A, 25 times of loop processes are performed from n=1 to n=25.

At step S25, defocus values DEF(n) of the distance map detection regions 219 set at step S21 are calculated. Here, the camera MPU 125 that functions as a defocus value calculation unit calculates the defocus values DEF(n) by the operation similar to the focus detection operation described above.

At step S26, the camera MPU 125 that functions as a focus detection information obtaining unit obtains and sets focus detection information on focus detection that includes coordinates of the distance map detection regions 219. Specifically, in a process of n=1 in the examples of FIG. 6A and FIG. 6B, position coordinates (x1, y1) of the distance map detection regions 219 (1, 1) are set. In a similar manner, in processes of n=2 and subsequent n, position coordinates of other regions are sequentially set.

Figures 14A, 14B:
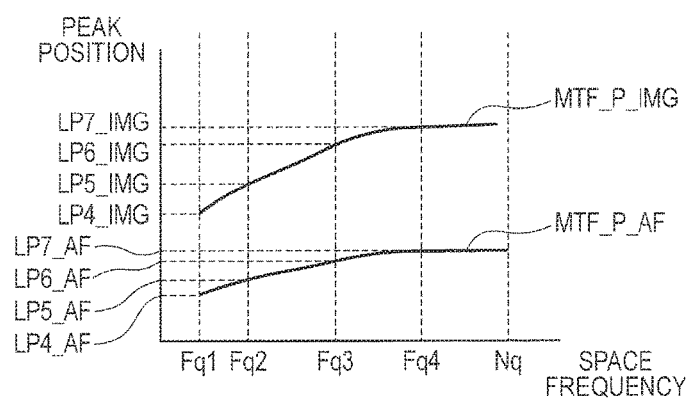
FIG. 14A is a table illustrating an example of focus detection information.
FIG. 14B is a graph illustrating a relationship between peak positions and space frequencies of defocus MTFs.

FIG. 14A illustrates an example of other focus detection information that may be set at step S26. FIG. 14A illustrates a table that, as an example of focus detection information, lists information indicating weighting degrees for each combination of directions (horizontal, vertical), colors (red, green, blue), and space frequencies (Fq1, Fq2, Fq3, Fq4) of the contrast for evaluating a focus state. While weighting information set here may be a value set in advance or may be a value changed in accordance with detected object information, the weighting information set so as to have different information between that used for focus detection and that us ed for a captured image.

Here, coefficients K_AF_H, K_AF_V, K_IMG_H, and K_IMG_V are coefficients for BP correction information of respective directions. Coefficients K_AF_R, K_AF_G, K_AF_B, K_IMG_R, K_IMG_G, and K_IMG_B are coefficients for BP correction information of respective colors. Coefficients K_AF_Fq1 to K_AF_Fq4 and K_IMG_Fq1 to K_IMG_Fq4 are coefficients for BP correction information of respective frequencies.

A specific example of weighting degrees will be described. As an example, when the direction of the contrast is horizontal, a signal of green is used, and a result of the contrast AF at the space frequency Fq1 is corrected, setting information used for focus detection is set as below.

K_AF_H=1
K_AF_V=0
K_AF_R=0
K_AF_G=1
K_AF_B=0
K_AF_Fq1=1
K_AF_Fq2=0
K_AF_Fq3=0
K_AF_Fq4=0

Such setting information can indicate that peak information of the defocus MTF of a signal used for focus detection has the same characteristics as a signal of green in the horizontal direction. On the other hand, setting information used for a captured image is set as below.

K_IMG_H=0.5
K_IMG_V=0.5
K_IMG_R=0.25
K_IMG_G=0.5
K_IMG_B=0.25
K_IMG_Fq1=0
K_IMG_Fq2=0
K_IMG_Fq3=1
K_IMG_Fq4=0

With such setting information, weighting for converting RGB signals into a signal equivalent to the Y signal is performed and a captured image is evaluated with the Y signal. Further, the contrasts in both directions of the horizontal direction and the vertical direction are evaluated with substantially the same weight and evaluated with the space frequency Fq3 that is different from the space frequency at focus detection. However, the specific setting values described above are as example and not limited thereto. Further, the types of the setting value to which weight is set are also an example and not limited thereto.

At step S27, the camera MPU 125 that functions as correction value calculation unit calculates BP correction value. Described here will be an example of calculating a BP correction value by using aberration information of the optical system associated with the pupil region TL, second aberration information or the pupil region whose centroid is different from that of the pupil region. TL, focus detection information representing weighting coefficients of colors, directions, and frequencies.

Specifically, position information (x1, y1) of the distance map detection regions 219 is first substituted to x and y of Equation (1). As a result of this calculation, Equation (1) is expressed in a form of the following Equation (2) by using coefficients Arh, Brh, and Crh.

$$MTF\_P\_RH(f) = Arh \times f^2 + Brh \times f + Crh. \quad (2)$$

The camera MPU 125 further calculates MTF_P_RV(f), MTF_P_GH(f), MTF_P_GV(f), MTF_P_BH(f), and MTF_P_BV(f) in a similar manner.

In this calculation, as illustrated in FIG. 13A, FIG. 13B, and FIG. 13C, curves of MTP_P_RH(f), . . . , MTF_P_BV(f) are separated from each other. For example, when the color aberration of the image capturing optical system is large, curves of respective colors are separated. When the aberration in the vertical and horizontal directions of the image capturing optical system is large, curves in the horizontal direction and curves in the vertical direction in FIG. 13A to FIG. 13C are separated. In such a way, in the present embodiment, defocus MTFs corresponding to space frequencies can be obtained for respective combinations of colors (R, G, B) and evaluation directions (H, V).

Next, the camera MPU 125 weights BP correction information of a pupil region selected at step S3 with coefficients (FIG. 14A) of focus detection information obtained at step S26. In this step, as described with step S3, BP correction information at focus detection is denoted as BP_TL, and BP correction information at a capturing is denoted as BP_A. This causes BP correction information (aberration information) to be weighted with respect to the color and the direction to be evaluated in focus detection and a capturing. Specifically, the camera MPU 125 calculates the space frequency characteristics MTF_P_AF(f) for focus detection and the space frequency characteristics MTF_P_IMG(f) for a captured image by using the following Equation (3) and Equation (4).

$$\begin{aligned}MTF\_P\_AF(f) = &\ K\_AF\_R \times K\_AF\_H \times MTF\_P\_RH1(f) + \\ &\ K\_AF\_R \times K\_AF\_V \times MTF\_P\_RV1(f) + \\ &\ K\_AF\_G \times K\_AF\_H \times MTF\_P\_GH1(f) + \\ &\ K\_AF\_G \times K\_AF\_V \times MTF\_P\_GV1(f) + \\ &\ K\_AF\_B \times K\_AF\_H \times MTF\_P\_BH1(f) + \\ &\ K\_AF\_B \times K\_AF\_V \times MTF\_P\_BV1(f)\end{aligned} \quad (3)$$

$$\begin{aligned}MTF\_P\_IMG(f) = &\ K\_IMG\_R \times K\_IMG\_H \times MTF\_P\_RH2(f) + \\ &\ K\_IMG\_R \times K\_IMG\_V \times MTF\_P\_RV2(f) + \\ &\ K\_IMG\_G \times K\_IMG\_H \times MTF\_P\_GH2(f) + \\ &\ K\_IMG\_G \times K\_IMG\_V \times MTF\_P\_GV2(f) + \\ &\ K\_IMG\_B \times K\_IMG\_H \times MTF\_P\_BH2(f) + \\ &\ K\_IMG\_B \times K\_IMG\_V \times MTF\_P\_BV2(f)\end{aligned} \quad (4)$$

In FIG. 14B, for discrete space frequencies Fq1 to Fq4, positions (peak positions) LP4_AF, LP5_AF, LP6_AF, and LP7_AF of the focus lens 104 at which respective defocus MTFs become the peak (maximum) are represented in the vertical axis.

Next, the camera MPU 125 calculates a focus position (P_AF) detected by using the focus position (P_IMG) of a captured image and the AF according to the following Equation (5) and Equation (6). In calculation, the space frequency characteristics MTF_P_IMG(f) and the weighting coefficients K_IMG_Fq1 to K_IMG_Fq4 and K_AF_Fq1 to K_AF_Fq4 are used.

$$P\_IMG = \\ MTF\_P\_IMG(1) \times K\_IMG\_Fq1 + MTF\_P\_IMG(2) \times K\_IMG\_Fq2 + \\ MTF\_P\_IMG(3) \times K\_IMG\_Fq3 + MTF\_P\_IMG(4) \times K\_IMG\_Fq4 \quad (5)$$

$$P\_AF = MTF\_P\_AF(1) \times K\_AF\_Fq1 + MTF\_P\_AF(2) \times K\_AF\_Fq2 + \\ MTF\_P\_AF(3) \times K\_AF\_Fq3 + MTF\_P\_AF(4) \times K\_AF\_Fq4 \quad (6)$$

That is, the camera MPU 125 weights maximum information of the defocus MTF for each space frequency illustrated in FIG. 14B with K_IMG_FQ and K_AF_FQ and adds the weighted maximum information. Thereby, a focused position (P_IMG) of a captured image and a focused position (P_AF) detected by the AF are calculated.

Next, the camera MPU 125 calculates BP correction values by using the following Equation (7). Note that, since this process is performed for each of the distance map detection regions n, a BP correction value is obtained for each of the distance map detection regions 219. Therefore, a BP correction value is denoted as BP(n).

$$BP(n)=P\_AF-P\_IMG \quad (7)$$

Next, at step S28, the camera MPU 125 that functions as a defocus value correction unit corrects a defocus value. The defocus value used herein may be a value obtained as a result of the contrast AF described above or may be a value obtained in the capturing surface phase difference AF. Calculation process of the following Equation (8) is performed, where a focus detection result for each of the distance map detection regions n is denoted as DEF(n) and a corrected focus detection result is denoted as cDEF(n).

$$cDEF(n)=DEF(n)-BP(n) \quad (8)$$

In such a way, correction of a defocus value for each of the distance map detection regions 219 allows an accurate distance map to be generated.

Upon the completion of 25 times of processes from n=1 to n=25, the loop process ends at step S29.

Figures 8A, 8B:
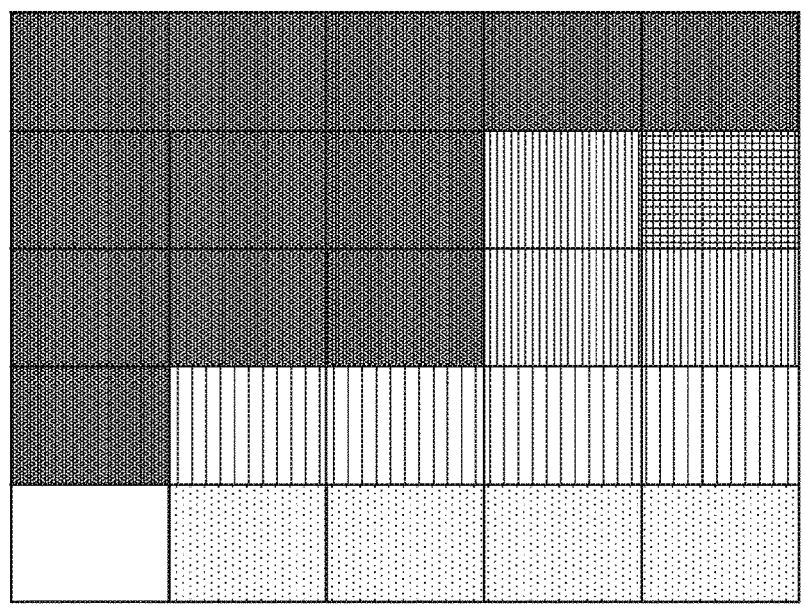
FIG. 8A and FIG. 8B are diagrams illustrating an example of a distance map according to the first embodiment.

At step S30, the camera MPU 125 that operates as a distance map generating unit stores, in a non-volatile field of the RAM 125$b$, the focus detection result cDEF(n) obtained after the BP correction in each of the distance map detection regions 219 to generate a distance map. A distance map as illustrated in FIG. 8A is obtained by quantifying and plotting the detection results of the cDEF(n) in respective distance map detection regions with a definition that zero represents infinity and a larger value in the positive side represents a closer point. A distance map as illustrated in FIG. 8B is obtained by displaying the magnitude of values of the cDEF(n) with light and shade. In addition, the cDEF(n) may be expressed by colors, and a color bar may be further added. These distance maps can be displayed on the display 126 according to an instruction from the camera MPU 125. Displaying a distance map in such a way realizes a distance map application that can facilitate visual recognition of the distance.

In the present embodiment, the calculation process for the position of the distance map detection regions 219, the color to be evaluated, and the contrast direction to be evaluated performed prior to the space calculation process for the frequency. This is because, in a mode where a position of the distance map detection regions 219 is set by a photographer, information of the position of the distance map detection regions, the color to be evaluated, and the direction to be evaluated is less frequently changed.

On the other hand, the space frequency is more frequently changed depending on a readout mode of the imaging device 122, a digital filter for an AF evaluation signal, or the like. For example, in a low brightness environment with a decreased the S/N ratio of a signal, the bandwidth of the digital filter may be changed to a low bandwidth. Therefore, a coefficient (peak coefficient) that is less frequently changed may be stored in advance after calculation thereof, and only a coefficient (space frequency) that is much frequently changed may be calculated, if necessary, to calculate BP correction value. This can reduce an amount of calculation.

According to the present embodiment, an information processing apparatus that can obtain a distance map corresponding to a parallax image is provided. A parallax image is an image based on light fluxes that have passed through different pupil regions. Therefore, the optical aberration of the image capturing optical system may be different for each parallax image. In such a case, a mere use of the optical aberration of the usual images for correction may result in an insufficient accuracy of correction. In the present embodiment, however, aberration information corresponding to a parallax image is used for correction, which allows for an accurate correction, and therefore an accurate distance map can be obtained.

Second Embodiment

Next, the second embodiment of the present invention will be described. In the present embodiment, the BP correction information BP_A of the pupil region EP1$a$ is replaced with the BP correction information BP_TL of the pupil region TL. Applying the present embodiment allows BP correction information corresponding to a pupil region to be referred without pre-storing BP correction information for each pupil region in a memory or the like. This can reduce a storage capacity required for storing BP correction information.

Note that, in the present embodiment, a configuration of the information processing apparatus, details of each focus detection system, a setting scheme of the focus detection regions 219, a focus detection process and obtaining of focus detection information, and the like are the same as those in the first embodiment unless otherwise specified, and duplicated description will be omitted or simplified.

Figure 10A:
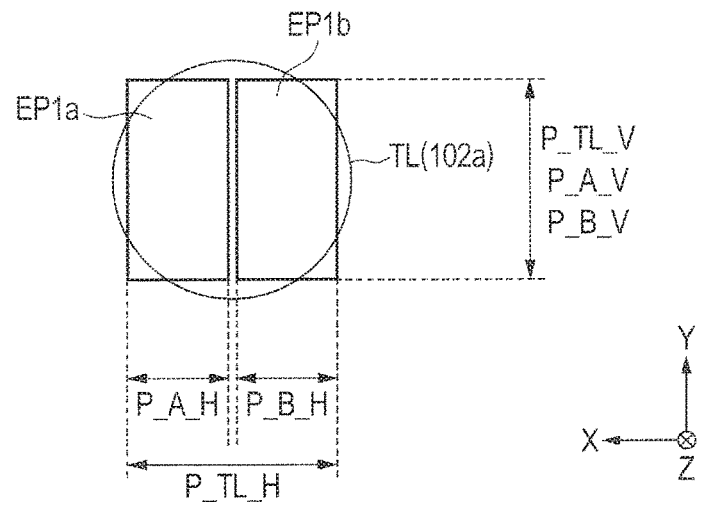
FIG. 10A and FIG. 10B are diagrams illustrating a configuration of an imaging device according to the second embodiment.
Figure 10B:
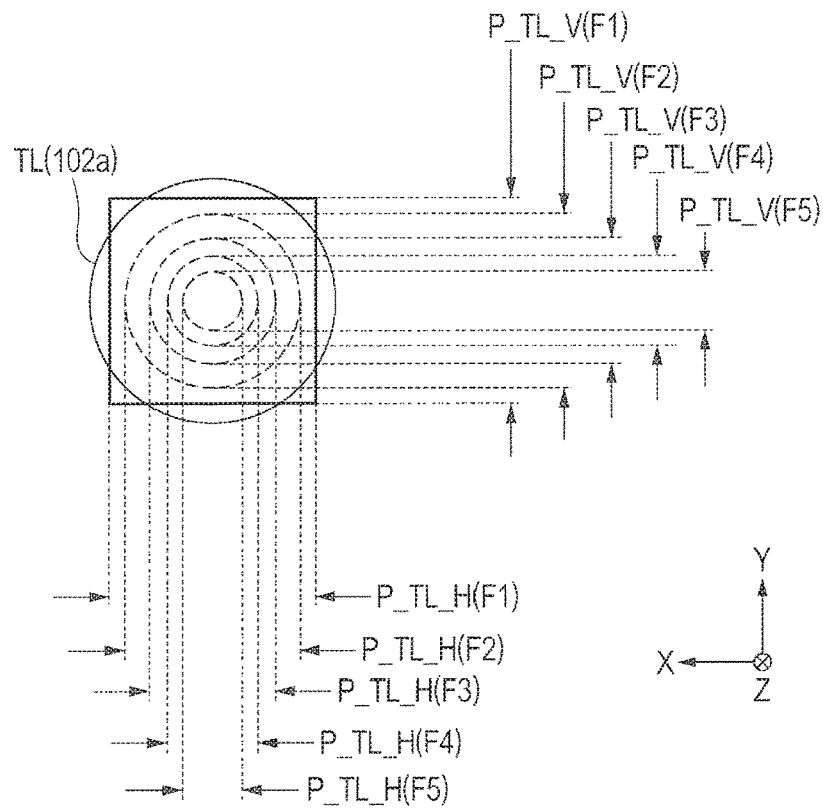
Figure 11:
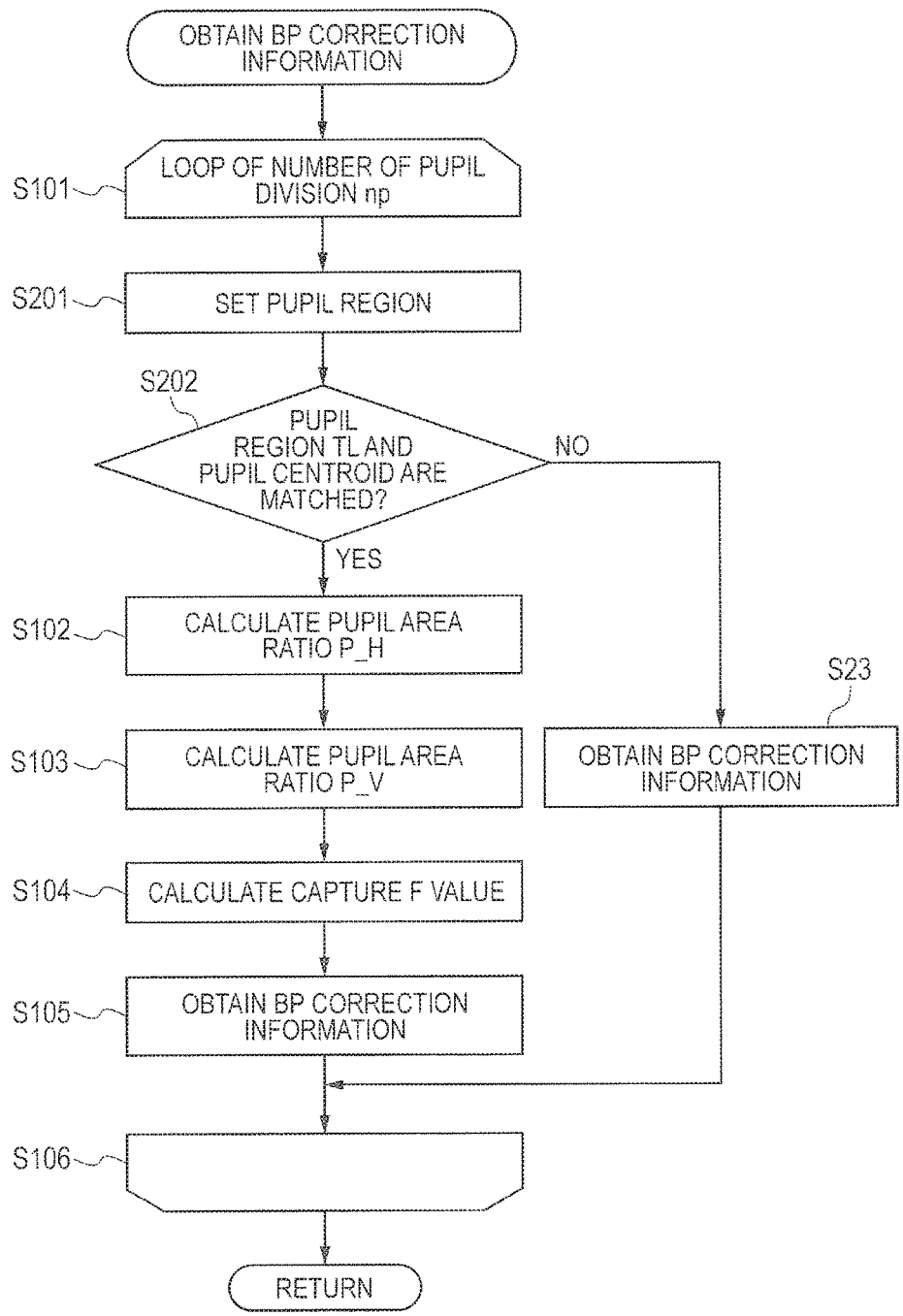
FIG. 11 is a flowchart illustrating an obtaining operation of BP correction information according to a third embodiment.

In the present embodiment, since an obtaining scheme of BP correction information is different from that of step S23 described in the first embodiment, description in this regard will be provided with reference to FIG. 9, FIG. 10A, and FIG. 10B.

At step S101, the process enters a loop process with np rounds of loops, where np corresponds to the number of pupil divisions. Here, the number np of pupil divisions is the number of photoelectric conversion units projected on an exit pupil plane of the image capturing optical system. For example, the examples of FIG. 4B and FIG. 10A illustrate the case of np=2. In other words, two rounds of processes, that is, a process corresponding to the pupil region EP1$a$ and a process corresponding to the pupil region EP1$b$ are sequentially performed.

At step S102, the camera MPU 125 calculates a pupil area ratio P_H in the horizontal direction of the pupil region EP1*a* in the pupil region TL with respect to a pupil region set at step S101. This process will be described by using FIG. 10A. Note that a pupil area ratio in the horizontal direction corresponding to the pupil region EP1*a* is denoted as P_A_H and a pupil area ratio in the horizontal direction corresponding to the pupil region EP1*b* is denoted as P_B_H.

As seen in FIG. 10A, the pupil area ratio P_A_H is half the pupil area ratio P_TL_H corresponding to the pupil region of a sum of the pupil region EP1*a* and the pupil region EP1*b*. Therefore, at step S102, the camera MPU 125 sets the pupil area ratio P_A_H to 1/2.

In a similar manner, a pupil area ratio in the vertical direction corresponding to the pupil region EP1*a* is denoted as P_A_V, and a pupil area ratio in the vertical direction corresponding to the pupil region EP1*b* is denoted as P_B_V. As seen in FIG. 10A, the pupil area ratio P_A_V is the same as the pupil area ratio P_TL_H corresponding to the pupil region of a sum of the pupil region EP1*a* and the pupil region EP1*b*. Therefore, at step S103, the camera MPU 125 sets the pupil area ratio P_A_V to 1.

At step S104, the camera MPU 125 calculates a capture F value corresponding to the pupil area ratio P_A_H and the pupil area ratio P_A_V set at step S102 and step S103. A capture F value is used for selecting the BP correction information BP_A from the BP correction information BP_TL table of the pupil region TL.

As described above, the BP correction information is information representing an aberration state of the optical system and changes depending on a zoom of the optical system, a capture F value (aperture), an object distance, or the like. FIG. 10B is a diagram illustrating a change in the pupil region according to the capture F value of the pupal region TL. In a state where the capture F value is F1 (open), the pupil area ratio in the horizontal direction corresponds to P_TL_H(F1), and the pupil area ratio in the vertical direction corresponds to P_TL_V(F1). As illustrated in FIG. 10B, a similar correspondence applies to each case where the capture F value is F2 to F5. In general, the larger the capture F value is (F1, F2, F3, . . . in FIG. 10B), the smaller the area of the pupil region is. The pupil region changing according to a difference of the capture F value varies concentrically. That is, the centroid is the same among these pupil regions.

The camera MPU 125 or the lens memory 118 pre-stores changes of the BP correction information BP_TL caused by changes of the F value as a memory table. In the example of FIG. 10B, the camera MPU 125 or the lens memory 118 pre-stores the BP correction information BP_TL_H(F1), . . . , BP_TL_H(F5) and BP_TL_V(F1), . . . , BP_TL_V (F5).

At step S105, the camera MPU 125 selects P_TL (xx is an integer of 1 to 5) that is the ratio closest to the pupil area ratio P_A_H and the pupil area ratio P_A_V. Thereby, an aberration state close to optical characteristics of each of the pupil regions EP1*a* and EP1*b* is selected from F value change information of the pupil region P_TL, and therefore a change of a focus with respect to a change in the area of a pupil region can be addressed. In the example of FIG. 10B, P_TL_H(F2) is selected as a pupil area ratio corresponding to the pupil area ratio P_A_H, and P_TL_V(F1) is selected as a pupil area ratio corresponding to the pupil area ratio P_A_V.

Then, BP_TL_H(F2) is obtained as BP correction information associated with the horizontal direction based on the pupil area ratio P_TL_H(F2), and BP_TL_V(F1) is obtained as BP correction information associated with the vertical direction based on the pupil area ratio P_TL_V(F1). In such a way, in the present embodiment, since BP correction information can be obtained by referring a table of BP correction information of the pupil region TL, BP correction information for each pupil region is not required to be pre-stored in a memory or the like. This can reduce a storage capacity required for storing BP correction information.

Upon the completion of two times of the processes from np=1 to np=2, the loop process ends at step S106.

In the present embodiment, BP correction information for each pupil region is used with reference to a table of BP correction information of the pupil region TL, and this allows for an advantage that appropriate BP correction information can be referred without requiring to store BP correction information for each pupil region in a memory or the like, in addition to the advantages of the first embodiment. Although a case where the number of pupil divisions is two has been described in the present embodiment, the number of pupil divisions is not limited thereto. Note that, since the operation of the present embodiment is executable when the information of the number of pupil divisions and the associated regions has been known, the operation may be selected at the time of pre-storing BP correction information.

Third Embodiment

Next, the third embodiment of the present invention will be described. In the present embodiment, described will be an example of a selection scheme of BP correction information when the number of pupil divisions is greater and the exit pupil plane distance Zep does not match the sensor pupil plane distance Sep. The present embodiment is different from the first and second embodiments in that, depending on the centroid of each pupil region, it is determined whether or not to refer BP correction information of each pupil region from a table regarding the change in the F value of the BP correction information BP_TL of the pupil region TL. Although the BP correction information BP_A of the pupil region EP1*a* is replaced with the BP correction information BP_TL of the pupil region TL in the second embodiment, application of the operation of the present embodiment allows for an accurate correction when both pupil regions are much different.

Figure 15A:
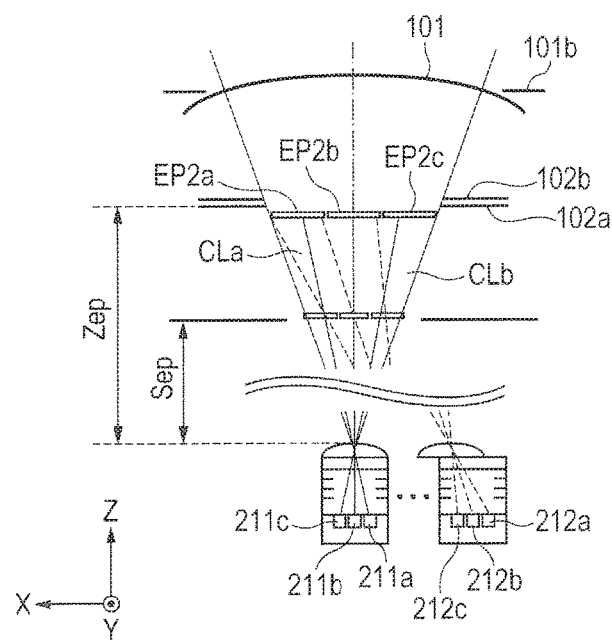
FIG. 15A, FIG. 15B, and FIG. 15C are diagrams illustrating a configuration of an imaging device according to the third embodiment.
Figure 15B:
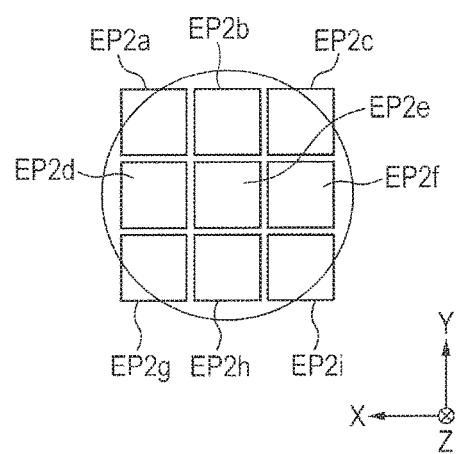

FIG. 15B is a diagram illustrating pupil division of the present embodiment. As depicted, the pupil region is divided into 9=3×3. Respective pupil regions are denoted as EP2*a*, EP2*b*, . . . , EP2*i*. FIG. 15A is a diagram representing a conjugate relationship between the exit pupil plane of the image capturing optical system and the photoelectric conversion units 211*a* to 211*c* and 212*a* to 212*c* of the pixels 211 and 212. Note that, in the present embodiment, a configuration of the information processing apparatus, details of each focus detection system, a setting scheme of the focus detection regions 219, a focus detection process and obtaining of focus detection information, and the like are the same as those in the first embodiment unless otherwise specified, and duplicated description will be omitted or simplified.

The present embodiment is different from the first embodiment and the second embodiment in an obtaining scheme of BP correction information, which has been described for step S23 in the first embodiment, and therefore description in this regard will be provided with reference to FIG. 11, FIG. 15A, FIG. 15B, and FIG. 15C. Since the operation of step S101 is the same as that illustrated in the second embodiment, description thereof will be omitted.

At step S201, pupil regions associated with respective photoelectric conversion units are set. In general, it is desirable that the exit pupil plane distance Zep to an exit pupil plane where an aperture of a capturing lens is set substantially match the distance (=the sensor pupil plane distance Sep) to a conjugate plane of an on-chip micro lens of a photoelectric conversion unit. In a design with a replaceable lens system, however, the exit pupil plane distance Zep does not necessarily match the sensor pupil plane distance Sep. In the present embodiment, as illustrated in FIG. 15A, description will be provided for a case where the sensor pupil plane distance Sep is set short with respect to the exit pupil plane distance Zep.

As illustrated in FIG. 15A, in a focus detection region in the center of a screen such as the photoelectric conversion units 211a, 211b, and 211c, the pupil regions corresponding to the photoelectric conversion units 211a, 211b, and 211c are EP2a, EP2b, and EP2c, respectively. That is, photoelectric conversion units correspond to pupil regions in a one-on-one manner.

In focus detection regions such as the photoelectric conversion units 212a, 212b, and 212c that are outside the center, however, photoelectric conversion units do not correspond to pupil regions in a one-on-one manner. Since the photoelectric conversion units 212a, 212b, and 212c have the sensor pupil plane distance Sep, a pupil region may be conjugate at a position that is distant by Sep from the micro lens. However, BP correction information (aberration information) in a pupil region is stored as aberration information for each of the pupil regions EP2a to EP2c divided at the position of the exit pupil plane distance Zep. Therefore, a dotted line extended from the photoelectric conversion unit 212a has no intersection point with any pupil region at the position of the exit pupil plane distance Zep. In a similar manner, pupil regions closest to the photoelectric conversion units 212b and 212c are EP2a and EP2b, respectively, and the correspondence is different from that in the case of the photoelectric conversion units 211a, 211b, and 211c. That is, when the exit pupil plane distance Zep and the sensor pupil plane distance Sep are not matched, the correspondence between photoelectric conversion units and pupil regions is different depending on a focus detection region.

Therefore, at step S201, the pre-stored correspondence between the positions of photoelectric conversion units and pupil regions is utilized to select a pupil region used for each focus detection region.

At step S202, the camera MPU 125 as a determination unit determines whether or not the pupil centroid of the pupil region TL is the same as the pupil centroid of a pupil region selected at step S101. The pupil centroid refers to representative coordinates of a pupil position in each pupil region. Description in this regard will be provided with reference to FIG. 15C.

Figure 15C:
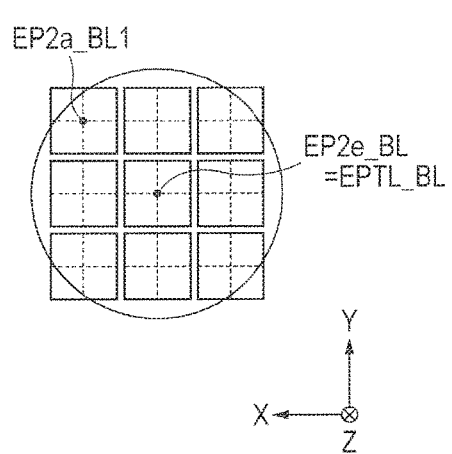

FIG. 15C illustrates pupil centroid coordinates EP2a_BL to EP2i_BL in respective pupil regions EP2a to EP2i on an exit pupil plane of the plurality of photoelectric conversion units as intersecting points of dotted lines. The pupil centroid in the pupil region EP2a is EP2a_BL1. In a similar manner, the pupil centroid in the pupil region TL is EPTL_BL, as illustrated in FIG. 15C.

At step S202, when the pupil centroid of the pupil region TL matches the coordinates of the pupil centroid of a pupil region set at step S101, the process proceeds to step S102, otherwise, the process proceeds to step S23. In the example of FIG. 15C, the process proceeds to step S102 for only the pupil region EP2e, while the process proceeds to step S23 for other pupil regions EP2a, EP2b, EP2c, EP2d, EP2f, EP2g, EP2h, and EP2i.

At step S23, BP correction information BP_A, BP_B, . . . associated with respective pupil regions are obtained. Since this operation is the same as the operation of step S23 of the first embodiment, description thereof will be omitted. Further, since operations from step S102 to step S106 of the present embodiment are the same as those of step S102 to step S106 of the second embodiment, description thereof will be omitted.

In the present embodiment, for only pupil regions having different pupil centroids, BP correction information for each pupil region is pre-stored in a memory, and this allows for an advantage that an accurate BP correction can be obtained while still maintaining the minimum storage amount of BP correction information for each pupil region, in addition to the advantages of the first embodiment. Note that, although a case where the number of pupil divisions is nine has been described in the present embodiment, the number of pupil divisions is not limited thereto. Further, since the operation of the present embodiment is executable when the information of the number of pupil divisions and the associated regions has been known, the operation may be executed at the time of pre-storing BP correction information in a memory or the like.

Other Embodiments

In the first to third embodiments, although the distance map and the BP correction value calculated using the BP correction information are described in dimension(s) of the defocus value, they are not limited thereto.

For example, the distance map may be generated based on a relative image displacement between signals based on the first image signal and the second signal because the relative image displacement, which is used to generate the defocus value, may be associated with the distance from the camera. In addition, the BP correction information also may be recorded in dimension(s) of the relative image displacement. Note that, the first image signal and the second image signal output from an imaging device including a plurality of photoelectric conversion units receiving light fluxes which have passed through different pupil regions of the image capturing optical system. The first pupil region corresponds to a pupil region through which a light flux received at the entire light receiving region of plurality of photoelectric conversion units passes.

For example, the distance map may be generated based on the object distance converted from the defocus value and the BP correction information also may be recorded adaptively to the object distance.

For example, the distance map may be generated based on a distribution of a driving amount (the number of pluses of the control signal or the like) of the lens. The driving amount is determined so that the lens moves to the focus position of the object corresponding to a region in a picture used for calculating the defocus information. In addition, the BP correction information also may be recorded in dimension(s) of the driving amount of the lens.

As noted above, the distance map may represent a distribution or at one of the relative image displacement between the plurality of signals based on the first image signal and the second image signal, the defocus value, and the driving amount of a lens in the image capturing optical system. In other words, the distance map may be generated based on a defocus information which may include the defocus value, the relative image displacement, and the driving amount of a lens.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-239135, filed Dec. 8, 2015, which is hereby incorporated by reference herein in its entirety.

What is claimed is:

1. An information processing apparatus comprising:
    an image signal obtaining unit configured to obtain a first image signal based on a light flux which has passed through a first pupil region of an image capturing optical system and a second image signal based on a light flux which has passed through a second pupil region of the image capturing optical system, the second pupil region being different from the first pupil region;
    an aberration information obtaining unit configured to obtain first aberration information of the image capturing optical system associated with the first pupil region and second aberration information of the image capturing optical system associated with the second pupil region;
    a calculation unit configured to calculate a first defocus information based on at least one of the first image signal and the second image signal;
    a correction unit configured to correct the first defocus information based on the first aberration information and the second aberration information to generate at least one second defocus information;
    a distance map generation unit configured to generate a distance map based on the second defocus information;
    a captured image generation unit configured to select one or more parallax images from a plurality of parallax images generated based on the first image signal and the second image signal to generate a captured image for displaying or recording; and
    wherein generation of the second defocus information is performed to each of a plurality of detection regions in which the focus detection is performed, and wherein the distance map generation unit generates a distance map based on a plurality of the second defocus information and coordinates of the plurality of detection regions.

2. The information processing apparatus according to claim 1, wherein the correction unit corrects the first defocus value based on, in addition to the first aberration information and the second aberration information, at least one of position coordinates of a region in an image signal used for calculating the first defocus information, a color of a light used for calculating the first defocus information, and a space frequency of a signal used for calculating the first defocus information.

3. The information processing apparatus according to claim 1, wherein the first aberration information and the second aberration information include information of a modulation transfer function (MTF) depending on at least one of position coordinates of a region in an image signal used for calculating the first defocus information, a color of a light used for calculating the first defocus information, and a space frequency of a signal used for calculating the first defocus information.

4. The information processing apparatus according to claim 1,
    wherein the first aberration information includes multiple pieces of aberration information corresponding to a plurality of pupil regions having a same centroid, and
    wherein the second aberration information is based on one of the multiple pieces of aberration information corresponding to the plurality of pupil regions having the same centroid.

5. The information processing apparatus according to claim 1, wherein the first aberration information includes multiple pieces of aberration information corresponding to a plurality of pupil regions having a same centroid, and
    the information processing apparatus further comprising a determination unit configured to determine, based on coordinates of a centroid of the second pupil region, whether or not to obtain the second aberration information based on one of the multiple pieces of aberration information corresponding to the plurality of pupil regions having the same centroid.

6. The information processing apparatus according to claim 1, wherein the second pupil region a region included in the first pupil region.

7. The information processing apparatus according to claim 1, wherein the image signal obtaining unit obtains the first image signal and the second image signal output from an imaging device including a plurality of photoelectric conversion units receiving light fluxes which have passed through different pupil regions of the image capturing optical system.

8. The information processing apparatus according to claim 7, wherein the first pupil region corresponds to a pupil region through which a light flux received at the entire light receiving region of plurality of photoelectric conversion units passes.

9. The information processing apparatus according to claim 1, wherein the first defocus information includes relative image displacement between a plurality of signals based on the first image signal and the second image signal.

10. The information processing apparatus according to claim 1, wherein the first defocus information includes a defocus value.

11. The information processing apparatus according to claim 1, wherein the first defocus information includes a driving amount of a lens in the image capturing optical system, the driving amount being determined so that the lens moves to a focus position of an object corresponding to a region in a picture used for calculating the first defocus information.

12. The information processing apparatus according to claim 1, wherein the distance map represents a distribution of at least one of a relative image displacement between a plurality of signals based on the first image signal and the second image signal, a defocus value, and a driving amount of a lens in the image capturing optical system.

13. The information processing apparatus according to claim 1, wherein the calculation unit calculates the first defocus information by calculating a relative displacement between a plurality of signals based on the first image signal and the second image signal.

14. The information processing apparatus according to claim 1, wherein the calculation unit calculates the first defocus information based on a contrast of images formed by the first image signal or the second image signal.

15. An information processing method comprising:
- an image signal obtaining step of obtaining a first image signal based on a light flux which has passed through a first pupil region of an image capturing optical system and a second image signal based on a light flux which has passed through a second pupil region of the image capturing optical system, the second pupil region being different from the first pupil region;
- an aberration information obtaining step of obtaining first aberration information of the image capturing optical system associated with the first pupil region and second aberration information of the image capturing optical system associated with the second pupil region;
- a calculation step of calculating a first defocus information based on at least one of the first image signal and the second image signal;
- a correction step of correcting the first defocus information based on the first aberration information and the second aberration information to generate a second defocus information;
- a distance map generation step of generating a distance map based on the second defocus information;
- a captured image generation step of selecting one or more parallax images from a plurality of parallax images generated based on the first image signal and the second image signal, and generating a captured image for displaying or recording; and
- wherein generation of the second defocus information is performed to each of a plurality of detection regions in which the focus detection is performed, and wherein the distance map generation step generates a distance map based on a plurality of the second defocus information and coordinates of the plurality of detection regions.

16. A computer readable storage medium storing a program that causes a computer to execute:
- an image signal obtaining step of obtaining a first image signal based on a light flux which has passed through a first pupil region of an image capturing optical system and a second image signal based on a light flux which has passed through a second pupil region of the image capturing optical system, the second pupil region being different from the first pupil region;
- an aberration information obtaining step of obtaining first aberration information of the image capturing optical system associated with the first pupil region and second aberration information of the image capturing optical system associated with the second pupil region; a calculation step of calculating a first defocus information based on at least one of the first image signal and the second image signal;
- a correction step of correcting the first defocus information based on the first aberration information and the second aberration information to generate a second defocus information;
- a distance map generation step of generating a distance map based on the second defocus information;
- a captured image generation step of selecting one or more parallax images from a plurality of parallax images generated based on the first image signal and the second image signal, and generating a captured image for displaying or recording; and
- wherein generation of the second defocus information is performed to each of a plurality of detection regions in which the focus detection is performed, and wherein the distance map generation step generates a distance map based on a plurality of the second defocus information and coordinates of the plurality of detection regions.

* * * * *